United States Patent
Kawai et al.

(10) Patent No.: US 8,016,412 B2
(45) Date of Patent: Sep. 13, 2011

(54) IMAGE RECORDING APPARATUS AND METHOD OF PRODUCING IMAGE RECORDING APPARATUS

(75) Inventors: Takamitsu Kawai, Obu (JP); Kazuhito Ishida, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1147 days.

(21) Appl. No.: 11/478,437

(22) Filed: Jun. 30, 2006

(65) Prior Publication Data

US 2007/0013654 A1 Jan. 18, 2007

(30) Foreign Application Priority Data

Jun. 30, 2005 (JP) ................................. 2005-192646

(51) Int. Cl.
 *B41J 29/13* (2006.01)
 *B41J 3/00* (2006.01)
(52) U.S. Cl. ........................................... 347/108; 347/2
(58) Field of Classification Search .................. 347/108, 347/101, 2; 346/145; 353/119; 355/21; 358/1.1; 399/81

See application file for complete search history.

(56) References Cited

U.S. PATENT DOCUMENTS

| | | | | |
|---|---|---|---|---|
| 4,940,994 A | * | 7/1990 | Habelt et al. ................... | 347/220 |
| 5,317,422 A | | 5/1994 | Fujimoto | |
| 5,443,320 A | * | 8/1995 | Agata et al. ................... | 400/715 |
| 5,566,048 A | * | 10/1996 | Esterberg et al. ......... | 361/679.27 |
| 5,659,361 A | * | 8/1997 | Jin ................................ | 348/375 |
| 5,796,576 A | * | 8/1998 | Kim .......................... | 361/679.28 |
| 6,373,689 B1 | * | 4/2002 | Yim .......................... | 361/679.29 |
| 6,781,821 B2 | * | 8/2004 | Tsubai .......................... | 379/29.1 |
| 6,850,226 B2 | * | 2/2005 | Finke-Anlauff .............. | 345/169 |
| 7,017,803 B2 | * | 3/2006 | Ichikawa et al. .............. | 235/379 |
| 7,203,058 B2 | * | 4/2007 | Hong ....................... | 361/679.06 |
| 7,216,401 B2 | * | 5/2007 | Bae ................................ | 16/324 |
| 7,359,209 B2 | * | 4/2008 | Lo ................................ | 361/755 |

(Continued)

FOREIGN PATENT DOCUMENTS

JP H02-132283 11/1989

(Continued)

OTHER PUBLICATIONS

HP Photosmart 385 Compact Photo Printer; Amazon.com; First published Jun. 29, 2005 (by Amazon.com); http://www.amazon.co.uk/Photosmart-385-Compact-Photo-Printer/dp/B000A3P3VS; pp. 1-4.*

(Continued)

*Primary Examiner* — Stephen D Meier
*Assistant Examiner* — Leonard S Liang
(74) *Attorney, Agent, or Firm* — Baker Botts L.L.P.

(57) ABSTRACT

An image recording apparatus has an apparatus body; a display unit; a first axis, a first bearing, a second axis and a second bearing which support the display unit pivotably to the apparatus body; a separate part which is formed unintegrally from the apparatus body, to which the first axis or the first bearing is attached, and which has a key; and an engaging part which is provided to the apparatus body and which extends along a surface of the apparatus body, and which is formed with a receiving part formed for receiving the key; wherein the key has been engaged with the receiving part. Accordingly, the separate part is firmly and tightly fixed to the apparatus body, and the display unit is pivotally supported to the apparatus body in a firm and tight manner.

9 Claims, 25 Drawing Sheets

U.S. PATENT DOCUMENTS

| | | | |
|---|---|---|---|
| 7,411,782 B2 * | 8/2008 | Kuo | 361/679.55 |
| 7,448,891 B2 * | 11/2008 | Ahn | 439/165 |
| 7,566,006 B2 * | 7/2009 | Cummings | 235/386 |
| 2004/0239633 A1 * | 12/2004 | Kogoh et al. | 345/168 |
| 2005/0144819 A1 * | 7/2005 | Shimizu et al. | 40/491 |
| 2006/0023408 A1 * | 2/2006 | Schlesener et al. | 361/683 |
| 2007/0002290 A1 | 1/2007 | Muraki et al. | |
| 2009/0033951 A1 * | 2/2009 | Sugahara | 358/1.1 |

FOREIGN PATENT DOCUMENTS

| | | |
|---|---|---|
| JP | H2 13283 | 11/1990 |
| JP | H03-067714 U | 7/1991 |
| JP | H04-198979 A | 7/1992 |
| JP | H04-107284 U | 9/1992 |
| JP | H04-349765 A | 12/1992 |
| JP | H05-44853 Y2 | 11/1993 |
| JP | 2000-066609 A | 3/2000 |
| JP | 2000-232503 A | 8/2000 |
| JP | 2000-232544 A | 8/2000 |
| JP | 2003 148450 | 5/2003 |
| JP | 2003 269440 | 9/2003 |
| JP | 2004-276324 A | 10/2004 |
| JP | 2005-242269 A | 9/2005 |
| JP | 2007-038665 A | 2/2007 |

OTHER PUBLICATIONS

HP Photosmart 380 Series User Guide; Hewlett Packard; Copyrighted and Published: 2005 (by Hewlett Packard); pp. 1-68.*

Japan Patent Office; Notice of Reasons for Rejection in Japanese Patent Application No. 2005-192646 (counterpart to the above-captioned U.S. patent application), mailed Apr. 30, 2009.

Japan Patent Office; Notice of Reasons for Rejection in Japanese Patent Application No. 2005-192646 (counterpart to the above-captioned U.S. patent application), mailed Apr. 30, 2009.

Japan Patent Office; Notice of Reasons for Rejection in Japanese Patent Application No. 2005-192646 (counterpart to the above-captioned U.S. Patent Application) mailed Feb. 4, 2009.

* cited by examiner

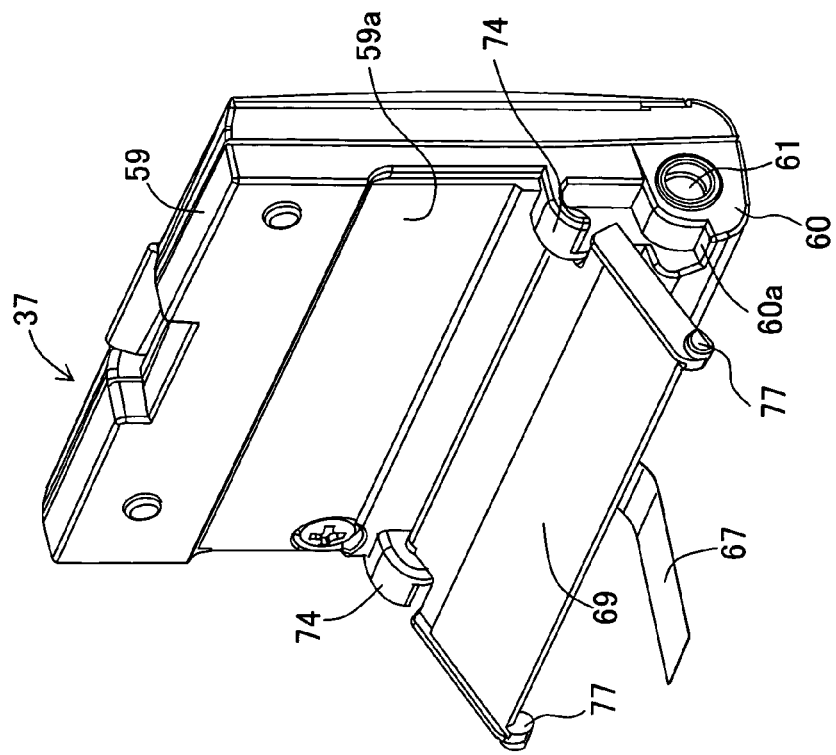
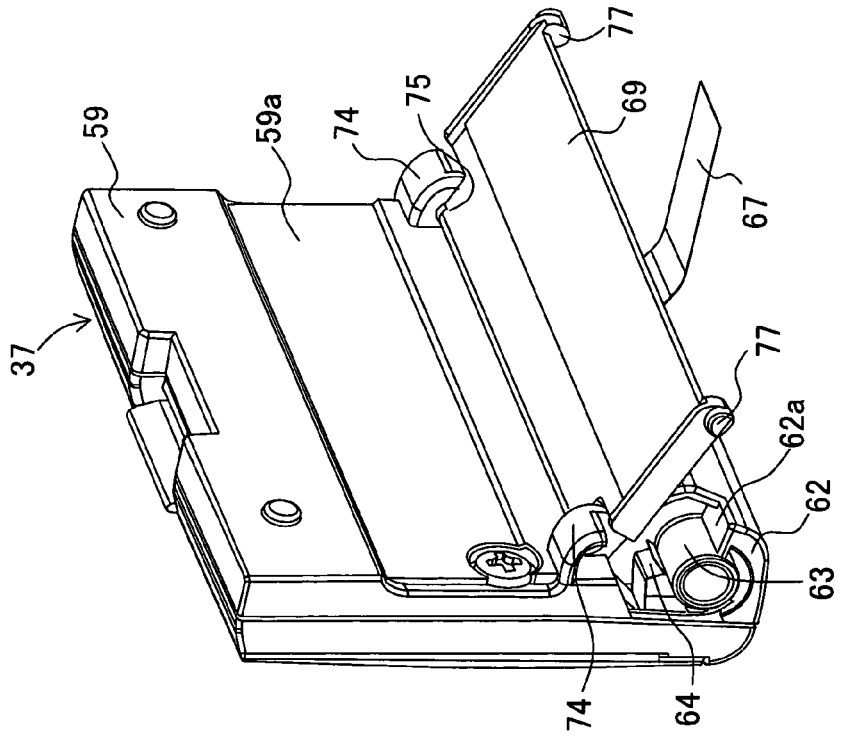
Fig. 9A
Fig. 9B

IMAGE RECORDING APPARATUS AND METHOD OF PRODUCING IMAGE RECORDING APPARATUS

CROSS REFERENCE TO RELATED APPLICATION

The present application claims priority from Japanese Patent Application No. 2005-192646, filed on Jun. 30, 2005, the disclosure of which is incorporated herein by reference in its entirety.

BACKGROUND OF THE INVENTION

1. Field of the Invention

The present invention relates to a structure of an image recording apparatus provided with a panel display device such as a liquid crystal panel unit which can display data such as an image and/or a letter, and a method of producing the image recording apparatus.

2. Description of Related Art

Conventional uni-function devices such as ink jet printers, copying machines, and fax machines, conventional multi-function and uni-function image recording apparatuses having a printing function, a copying function, a scanning function, and/or a facsimile function, and conventional electronic terminal devices are each provided with a display panel unit which informs an user of the instructions for achieving the functions of the associated device or recording apparatus, the present status of the device or recording apparatus, the procedure for operating the device or recording apparatus, and/or the like.

Japanese Patent Application Laid-open No. 2003-148450 describes an electronic terminal device having a main case and a display unit, which houses a flat and thin display element such as an LCD (liquid crystal display) element. The display unit is mounted on a surface (upper surface) of the main case such that the display unit can pivot up and down and thus a display screen of the display unit can be held at a suitable angle of inclination so that the information displayed on the screen on the display unit can be seen easily while the terminal device is used.

In this case, a pair of tilt support axes are arranged in a tilt body as a housing of the display unit, the tilt support axes being arranged at portions, respectively, in the outer circumference portions at both side surfaces of the tilt body; and a recess is formed in the main case as a portion at which the tilt body is to be attached. Further, elongated holes are formed, on both sides of the recess, as engaging parts to which the tilt support axes are engaged respectively. In this case, the tilt body is constructed such that one end portion of one of the both side surfaces of the tilt body is flexible so as to shorten the distance between the pair of tilt support axes; and that when the tilt body is pushed to the recess, the flexible one end of the tilt body is curved or warped first such that the distance between the pair of tilt support axes is shorted; and then when each of the tilt support axes is fitted to one of the elongated holes, thereby preventing the tilt body from being disengaged from the main case.

In another embodiment of the Japanese Patent Application Laid-open No. 2003-148450, recesses for receiving the tilt support axes are formed at portions, respectively, in the outer circumference portions at both side surfaces of the tilt body; and tilt support axes are arranged in the main case at portions at both ends, respectively, of the recess in the main case. It is constructed such that the portions at the both sides of the recess, at which the tilt axes are formed respectively are flexible, and when the tilt body is attached to the recess, the both side portions of the recess are warped to increase the distance between the both side portions of the recess; and that the tilt body is prevented from being disengaged from the main case when the tilt support axes subsequently are fitted to the recesses for the receiving the tilt support axes, respectively.

In an electronic device described in Japanese Utility Model Application Laid-open No. 2-132283, when arranging a display case having a LCD panel on the upper surface of a device case such that the LCD case is pivotable (inclinable), a ratchet body is fixed, with screws, to an attachment part formed at the lower edge of a lower case in the display case. In this case, the ratchet body is constructed such that the ratchet body has a fixed ratchet having radial teeth provided at one end surface of the fixed ratchet, an axis which has a screw hole and which is arranged at the central portion in the end surface of the fixed ratchet, and an attachment-objective part (block part) which has a screw hole and which is arranged at the other end surface of the fixed ratchet; and the ratchet body is formed as an integrated body.

In the construction described in the Japanese Patent Application Laid-open No. 2003-148450, however, the both side surfaces in the tilt body or the both side portions of the recess in the main case are constructed to be flexible. Accordingly, the deformation amount of the shortening (decreasing) the distance between the both side surfaces of the tilt body, or the deformation amount of the widening (increasing) the distance between the both side portions of the recess in the main case is finite (limited). Therefore, length of the support axes cannot be excessively increased. In other words, the strength of the hinge part cannot be enhanced substantially. Consequently, there is a problem that, when a user inadvertently or mistakenly lifts the tilt body upwardly, thereby moving the tilt body together with the main case, the hinge section is broken or damaged, and the support axis or axes is/are disengaged.

On the other hand, in the construction described in the Japanese Utility Model Application Laid-open No. 2-132283, although it is possible, in terms of design, to arbitrarily increase the length of the axes and the receiving parts, the strength of the attachment-objective part (block part), in which a movable ratchet body is fixed with the screws to the attachment part in the lower case, also needs to be enhanced by increasing the size of the block part and increasing the thickness of the screws so as to prevent the breakage or damage which would be caused when the tilt body is lifted. In this case also, there is a problem that the product cannot be compact and the production cost cannot be lowered.

SUMMARY OF THE INVENTION

An object of the present invention is to provide an image recording apparatus which is compact as a whole and with which the production cost can be lowered by devising a construction in which a hinge member, formed unintegrally from (formed as a separate body from) the apparatus, is mounted on (attached to) the apparatus body, and by appropriately selecting a material for forming the hinge member. Another object of the present invention is to provide a method of producing such an image recording apparatus.

According to a first aspect of the present invention, there is provided an image recording apparatus including:
an apparatus body;
a display unit;
a first axis, a first bearing, a second axis and a second bearing which support the display unit pivotably to the apparatus body;

a separate part which is formed unintegrally from the apparatus body, to which the first axis or the first bearing is attached, and which has a key; and an engaging part which is provided to the apparatus body and which extends along a surface of the apparatus body, and which is formed with a receiving part formed for receiving the key;

wherein the key has been engaged with the receiving part.

In the present invention, since the key provided to the separate part is engaged with the receiving part formed in the engaging part of the apparatus body, it is possible to fix the display unit tightly and firmly to the apparatus body, without the display unit rattling with respect to the apparatus body. In addition, since the first axis or the first bearing is attached to the separate part which is formed unintegrally from the apparatus body, the length of the axis does not affect the attaching operation for mounting (assembling) the display unit on (to) the apparatus body. Accordingly, it is possible to increase the length of the first axis and the first bearing. Therefore, it is possible to provide an axis support section which is firm and strong, and even when the user inadvertently lifts the display unit upwardly, the display unit is prevented from being disengaged from the apparatus body.

In the image recording apparatus of the present invention, the first axis may be longer than the second axis.

Accordingly, it is possible to make the length of the first axis to be any necessary length upon forming the first axis.

The image recording apparatus of the present invention may further include a locking mechanism which locks the key engaged with the receiving part.

Accordingly, when the separate part is engaged with (in) the apparatus body, the separate part is locked to the apparatus body with the locking mechanism, thereby making it possible to regulate the movement of the display unit in a direction of the axes.

In the image recording apparatus of the present invention, a latch part may be provided to the separate part, the latch part adjusting an inclination angle of the display unit relative to the apparatus body and holding an angle at which the display unit is inclined relative to the apparatus body.

Accordingly, the display unit can be held very easily at a posture having an angular position at which the display unit is easily visible for the user. This makes also makes it very simple to adjust the angular position of the display unit.

In the image recording apparatus of the present invention, a cover may be attached to an upper surface of the apparatus body; and a rib which regulates a movement of the separate part may be formed in the inside of the cover.

In this case, only by covering the cover and fixing the cover to the apparatus body, the separate part can be held to the position in which the separate part is engaged.

In the image recording apparatus of the present invention, an entry key-arrangement section at which entry keys are arranged may be provided to the cover; and a plurality of light sources corresponding to the entry keys, respectively, in the entry key-arrangement section may be partitioned by the rib.

In this case, light beam, irradiated from one of the light sources onto one of the entry keys, does not illuminate other entry keys in the entry key-arrangement section. Since a rib formed to be box-shaped generally has a high rigidity, the effect of regulating the movement of the separate part can be further enhanced.

In the image recording apparatus of the present invention, the first bearing and the second bearing may be formed in the display unit; and the first axis and the second axis, which are fitted to the first bearing and the second bearing, respectively, may be formed integrally with the separate part and the apparatus body, respectively.

In this case, even when the length of the bearing in the apparatus body is made to be long, there is no need to increase the width, of the display unit, in the left and right direction, thereby making the display unit to be compact.

In the image recording apparatus of the present invention, the separate part may be integrally formed of a wear-resistant synthetic resin.

In this case, even when the display unit is repeatedly pivoted, there is no rattling due to the wear, for example, in the axis and the bearing, thereby enhancing the durability, for example, of the axis and the bearing. Further, when a synthetic resin also with a low thermal shrinkage is used as the resin, is possible to assemble a pivoting portion of the display unit highly precisely and firmly (without rattling).

In the image recording apparatus of the present invention, a contact part which extends along a surface of the apparatus body may be provided to one of the apparatus body and the separate part; and a contact-objective part may be provided to a mounting part of the display unit at which the display unit is mounted on the apparatus body, the contact-objective part being brought into contact with the contact part when the display unit is erected with respect to the apparatus body.

In this case, even when the user inadvertently grabs and lifts the display unit upwardly, the display unit is not inadvertently disengaged. Further, it is possible to regulate the pivoting movement of the display unit in a forward direction of the apparatus body.

According to a second aspect of the present invention, there is provided a method of producing an image recording apparatus, the method including:

providing an apparatus body having a first axis or a first bearing, and having a key receiving part;

providing a display unit having a first bearing or a first axis, and having a second bearing or a second axis;

engaging the first bearing or the first axis of the display unit with the first axis or the first bearing of the apparatus body;

providing a separate part which is formed unintegrally from the apparatus body, which has a second axis or a second bearing, and which has a key;

engaging the second axis or the second bearing of the separate part with the second bearing or the second axis of the display unit, and engaging the key of the separate part with the key receiving part of the apparatus body.

In the present invention, the second axis or the second bearing is provided to the separate part which is formed unintegrally from the apparatus body. Accordingly, even when the length of the second axis and the second bearing is made to be long, this does not affect the operation for mounting the display body. In addition, since the length of the axis and bearing can be long, an axis support section which is firm and strong can be provided. Therefore, even when the user inadvertently lifts the display unit upwardly, the display unit is prevented from being disengaged from the apparatus body.

In the method of producing the image recording apparatus of the present invention, the separate part may be moved toward the key receiving part of the apparatus body so as to engage the key of the separate part with the key receiving part of the apparatus body. In this case, by a simple operation in which the separate part is moved toward the key receiving part of the apparatus body so as to engage the key of the separate part with the key receiving part of the apparatus body, the apparatus body and the separate part can be firmly and tightly fixed to each other.

BRIEF DESCRIPTION OF THE DRAWINGS

FIGS. 9A and 9B are back perspective views of a LCD panel unit of the image recording apparatus.

PREFERRED EMBODIMENTS OF THE INVENTION

Embodiments of the present invention will be described below in detail with reference to the drawings.

Image Recording Apparatus

An embodiment of the present invention will be described below. An image recording apparatus 1 according to this embodiment is a multi-function device (MFD) having printing, copying, scanning and faxing functions. In the embodiment shown in FIGS. 1 and 2, the image recording apparatus 1 has a lower body 2 as a housing (apparatus body), which is an injection molding of synthetic resin.

Figure 1:
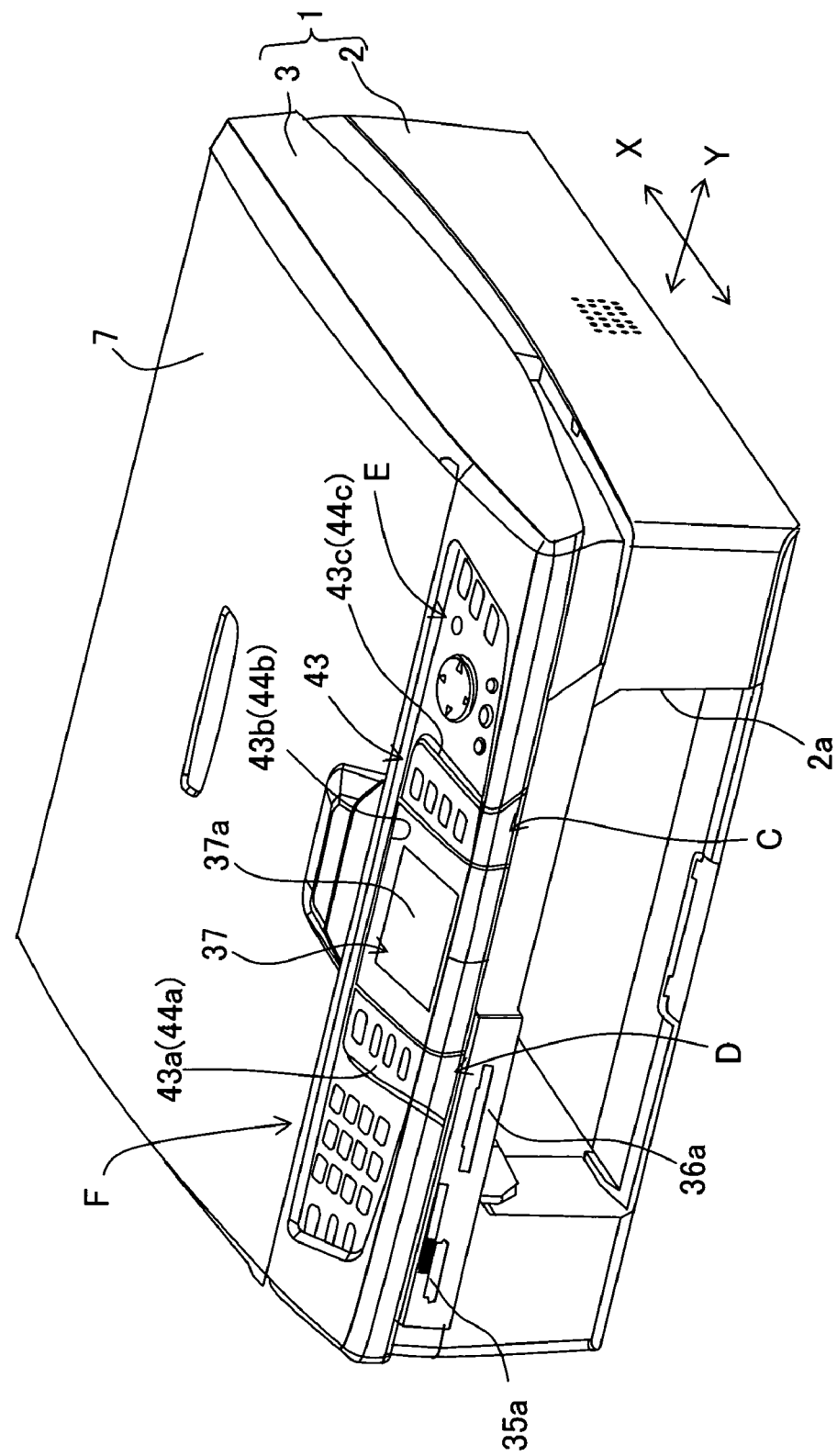
FIG. 1 is a perspective view of an image recording apparatus of an embodiment to which the present invention is applied.
Figure 2:
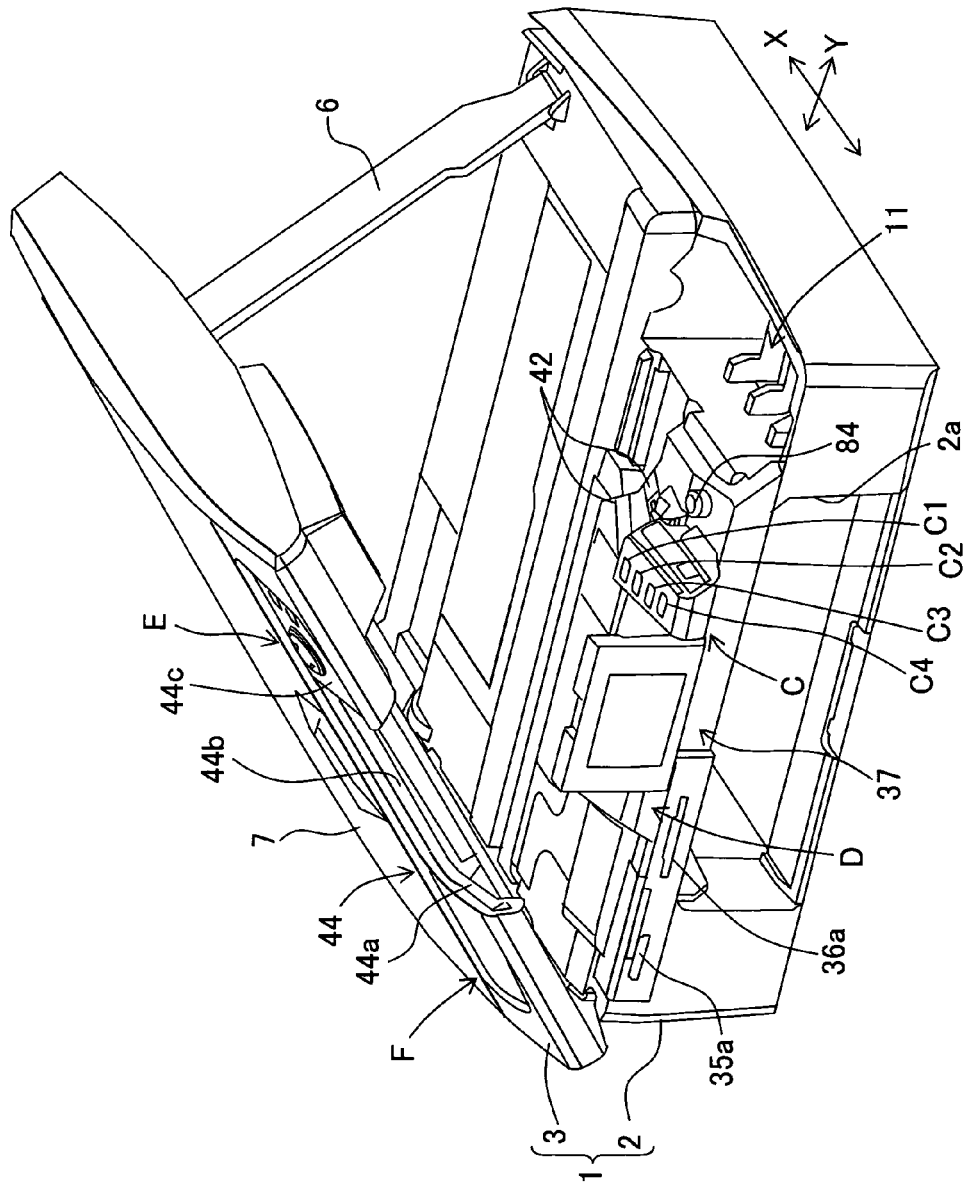
FIG. 2 is a perspective view of the image recording apparatus, showing its upper body opened widely upward from its lower body.

The image recording apparatus 1 also has an upper body 3, which is another injection molding of synthetic resin. The upper body 3 is attached to the upper surface of the lower body 2 and can pivot up and down on a pivot axis on one of the right and left sides of the lower body 2. Specifically, when an opening 2 a is formed on the front surface (FIG. 1) of the lower body 2, the upper body 3 pivots relative to the lower body 2 around a pivot axis on the left side of the lower body 2. As shown in FIG. 2, the upper body 3 can be held in an open position by a stay or strut 6, one end of which is attached pivotably on the upper surface of the lower body 2.

Figure 5:
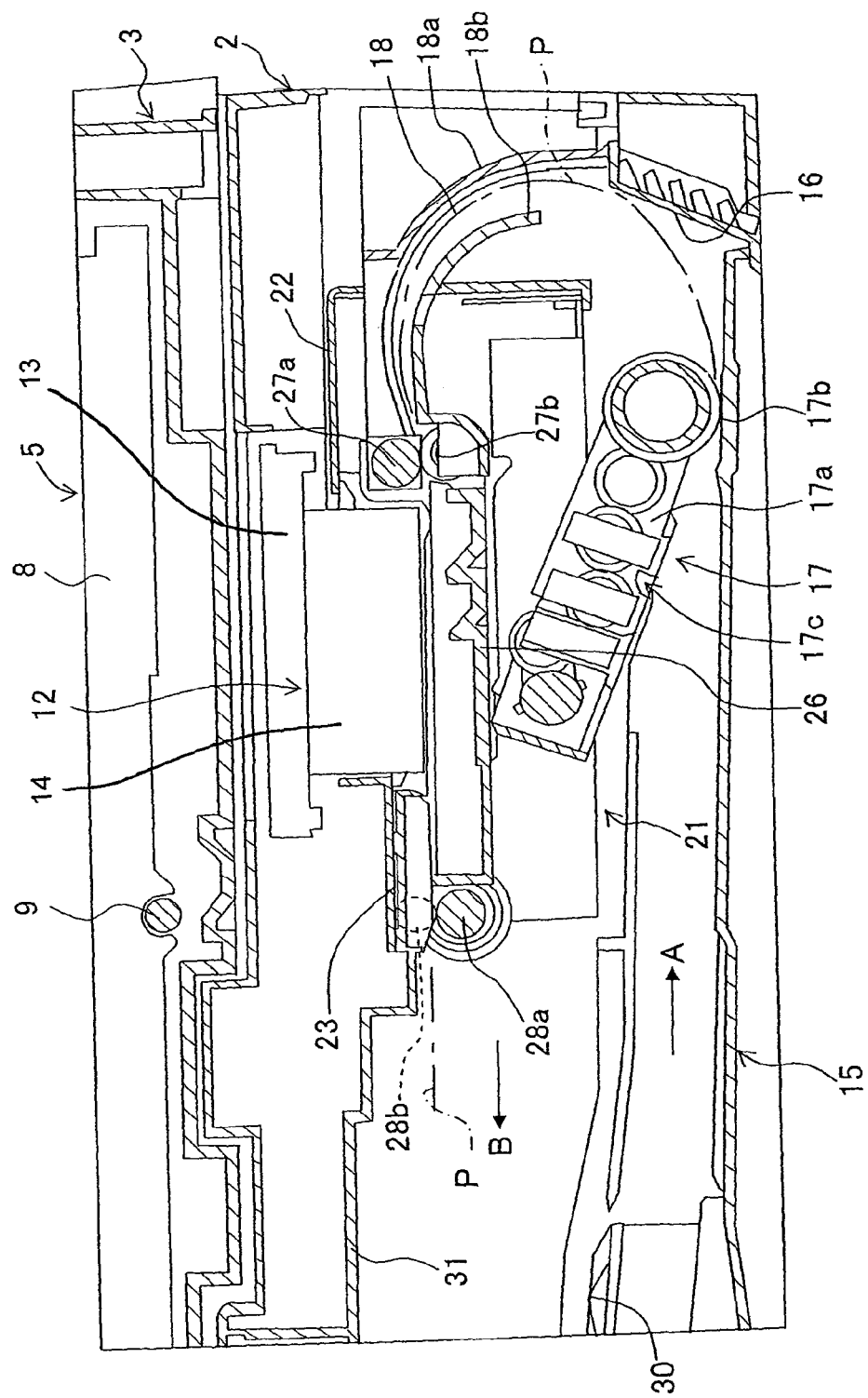
FIG. 5 is an enlarged sectional side view of a main portion of the image recording apparatus, showing its recording section and paper feeding section.

The upper body 3 has an image reading unit 5 incorporated in the upper body 3 for the copying and faxing functions. The image reading unit 5 is constructed of a glass plate and a contact image sensor (CIS) 8. The upper body 3 also has a paper (document) cover 7. With the paper cover 7 opened upward, a paper (document) can be placed on the glass plate. The contact image sensor 8 is displaced below the glass plate and reads an image on the paper placed on the glass plate. With reference to FIG. 5, the contact image sensor 8 is arranged to be reciprocapable along a guide rod 9 extending in a direction orthogonal to the sheet surface of FIG. 5 (primary scanning directions, a direction along the Y axis in FIGS. 1 and 2). The rear end of the paper cover 7, which covers the upper surface of the image reading unit 5, is hinged to the rear end of the upper body 3 so that the cover 7 can pivot up and down around its rear end.

The lower body 2 has an ink storage section 11 formed on one of its right and left sides (the right side in FIG. 2, which is farthest from the pivot axis around which upper body 3 pivots relative to the lower body 2). The storage section 11 is open at its top and stores ink cartridges (not shown) for different colors. In this embodiment, the storage section 11 stores ink cartridges containing black (BK), cyan (C), magenta (M) and yellow (Y) inks. The ink cartridges are connected through flexible supply tubes to an ink jet recording head 14 in a recording section 12, which will be described later on.

Figure 3:
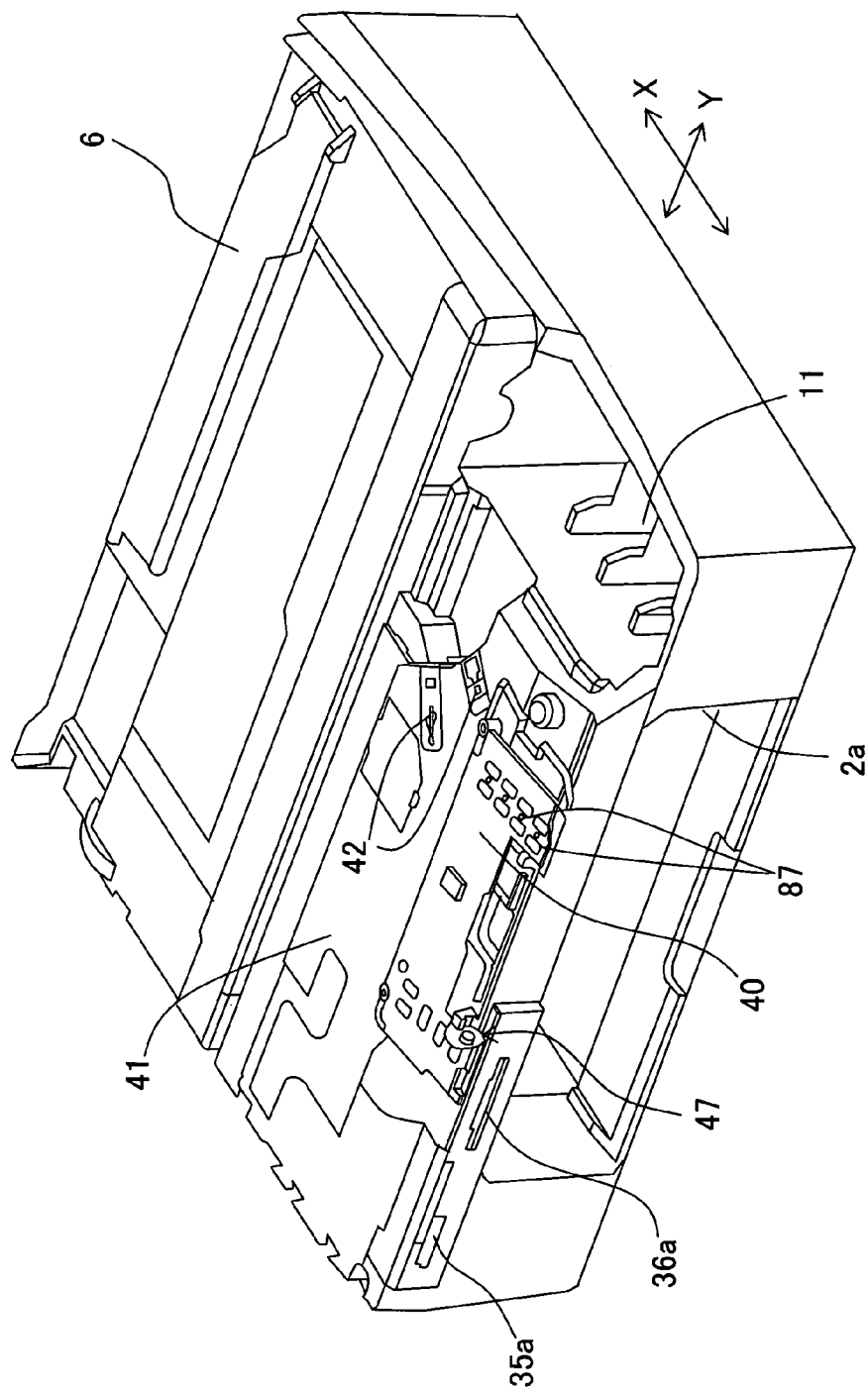
FIG. 3 is a perspective view showing a state in which an upper cover 41 and a switch board 40 are mounted on the upper surface of the lower body.

With reference to FIG. 5, sheets of paper P are piled in a feed cassette 15 positioned detachably in the bottom portion of the lower body 2. The feed cassette 15 is inserted through the opening 2a on the forward side (front side) of the lower body 2. In FIGS. 1 and 3, the feed cassette 15 is detached. In this embodiment, sheets of paper P as recording media can be piled in the feed cassette 15, with their short sides (width) extending in a direction (primary scanning direction, direction along the Y axis) orthogonal to the paper feeding direction (direction indicated by an arrow "A"). The sheets P may be cut sheets of A4 size, letter size, legal size, postcard size, or the like.

An inclined separation plate 16 for sheet separation is arranged behind the feed cassette 15 (on the right side of the cassette 15 in FIG. 5). The separation plate 16 is formed so as to project at a central portion in the width direction of paper P (Y-axis direction) and curves backward toward the right and left sides in the width direction of the sheet P in a plan view. The separation plate 16 is provided with an elastic sawtooth separation pad (not shown) in its middle portion in the width direction of the sheet P. The leading end of the sheet P comes into contact with the separation pad, which facilitates the separation of the sheet P from another sheets P piled in the feed cassette 15.

A paper feed mechanism 17 has a feed arm 17a. A base end of the feed arm 17a is attached pivotably on the side of the lower body 2 so that the feed arm 17a can pivot upwardly and downwardly. A free end of the feed arm 17a is provided with a feed roller 17b. The feed arm 17a is has a gear transmission mechanism 17c provided therein. The gear transmissions mechanism 17c in the feed arm 17a transmits torque from a motive power source (not shown) to the feed roller 17b. The feed roller 17b and the elastic sawtooth separation pad of the inclined separation plate 16 cooperate to feed the sheets P in the feed cassette 15 separately one after one. A sheet of paper P which is separated so as to move in the feeding direction A is fed through a transporting (conveying) passage 18 including a portion substantially in the shape of a horizontally placed letter "U", to the recording section 12 disposed above (at a position higher than) the feed cassette 15. The transporting passage 18 is formed between a first transporting path body 18a and a second transporting path body 18b which define its U-shaped outer and inner peripheries respectively.

As shown in FIG. 5, the recording section 12 is formed between a first guide member 22 and a second guide member 23 which extend along the Y axis (in the primary scanning direction). The guide members 22 and 23 are supported by a main frame 21 in the shape of a box and a pair of side plates, which are positioned on the right and left sides of the frame 21. The first guide member 22 is upstream of the second guide member 23 in a discharging direction (direction indicated by an arrow "B"). The ink jet recording head 14 in the recording section 12 is provided to a carriage 13 supported slidably by the guide members 22 and 23, so that the carriage 13 can reciprocate along the Y axis.

A CR (carriage) motor (not shown) is fixed to the lower surface of the second guide member 23, which is downstream of the first guide member 22 in the discharging direction B. A timing belt (not shown) is arranged on the upper surface of the second guide member 23 such that the timing belt extends in the primary scanning directions (the Y axis direction) over the second guide member 23. The CR motor drives the timing belt, which reciprocates the carriage 13.

With reference to FIG. 5, a flat platen 26, which extends in the Y axis direction so as to face the lower surface of the recording head 14 on the carriage 13, is fixed to the main frame 21 between the guide members 22 and 23.

As shown in FIG. 2, a drive roller 27a and a nip roller 27b, as a transporting (resist) roller pair, are arranged on an upstream the side, of the platen 26, in the discharging direction (direction indicated by an arrow "B"). The conveying roller pair transports a sheet of paper P to a position below the recording head 14. As described above, the conveying roller pair is constructed of the drive roller 27a and the nip roller 27b which is positioned below the drive roller 27a and biased against it. A discharge roller pair, constructed of a discharge roller 28a and a spur roller 28b, is arranged on a downstream side, of the platen 26, in the discharging direction (direction B). The discharge roller 28a is driven to transport, in the discharging direction B, the sheet P moving from the recording section 12. The spur roller 28b is positioned over the discharge roller 28a.

A sheet of paper P with an image recorded on a side thereof in the recording section 12 is discharged, with this recorded side facing upward, to a discharge tray 30 provided over the feed cassette 15. The discharge tray 30 communicates with a discharge port 30a formed in common with the opening 2a on the front side of the lower body 2. With reference to FIG. 5, a partition plate (lower cover) 31 made of a synthetic resin is formed integrally with the lower body 2. The partition plate 31 extends to cover a portion above the discharge tray 30, between the lower surface of the second guide member 23 disposed in the downstream in the discharge direction B and the discharge port 30a on the front side of the lower body 2.

Figure 4:
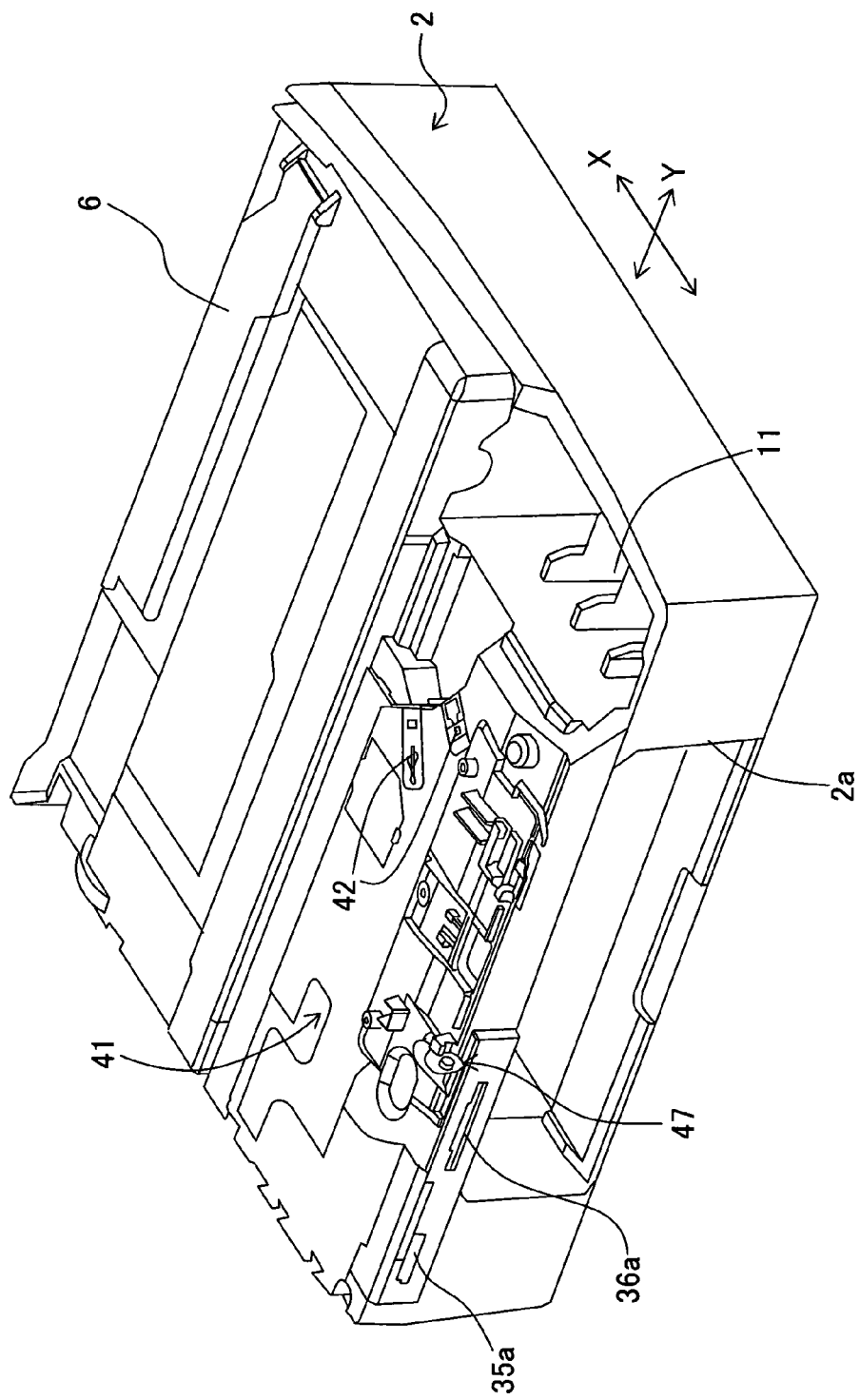
FIG. 4 is a perspective view of the lower body from which the switch board 40 is removed.
Figure 6:
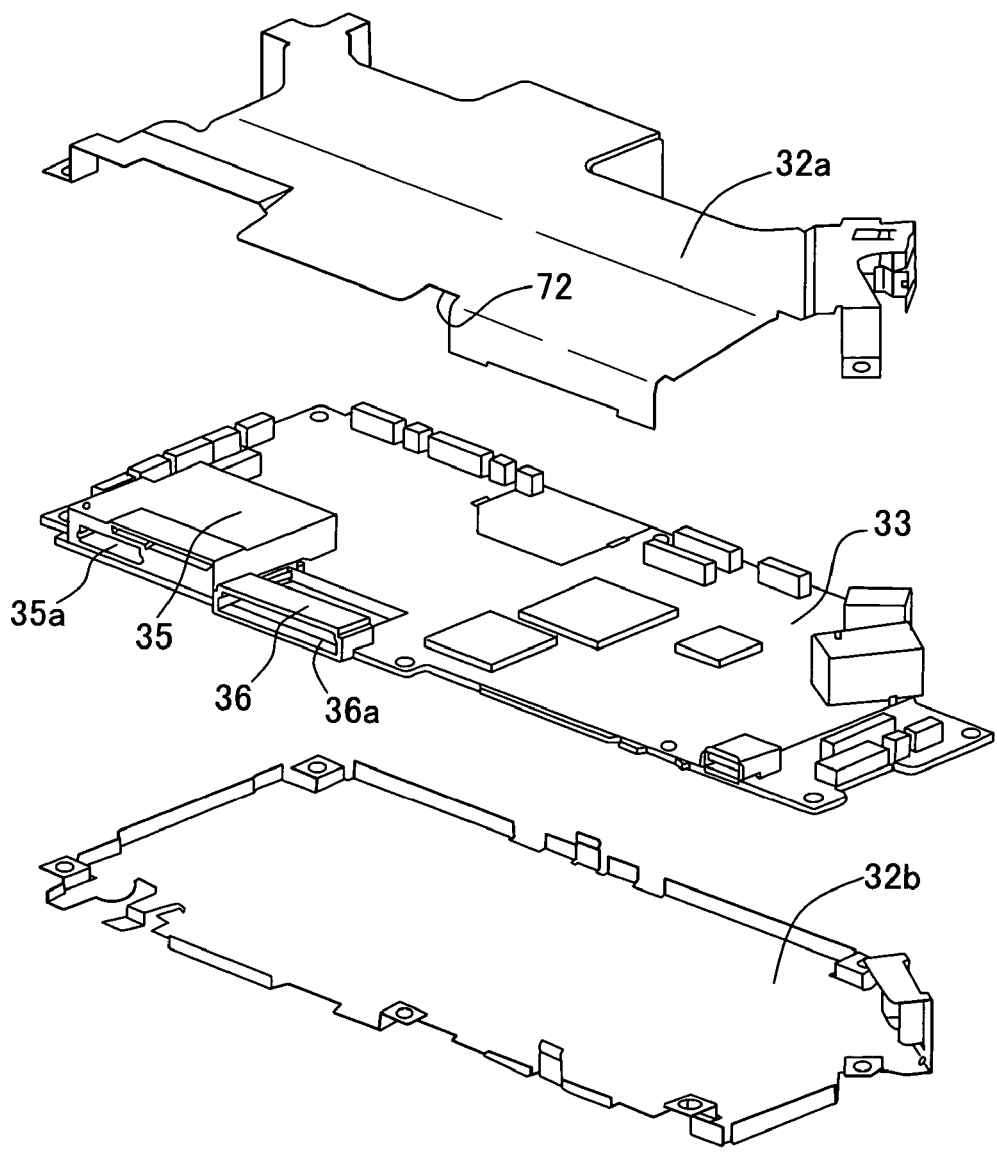
FIG. 6 is a perspective view in a state that a shield case and a main control board of the image recording apparatus are exploded.
Figure 7:
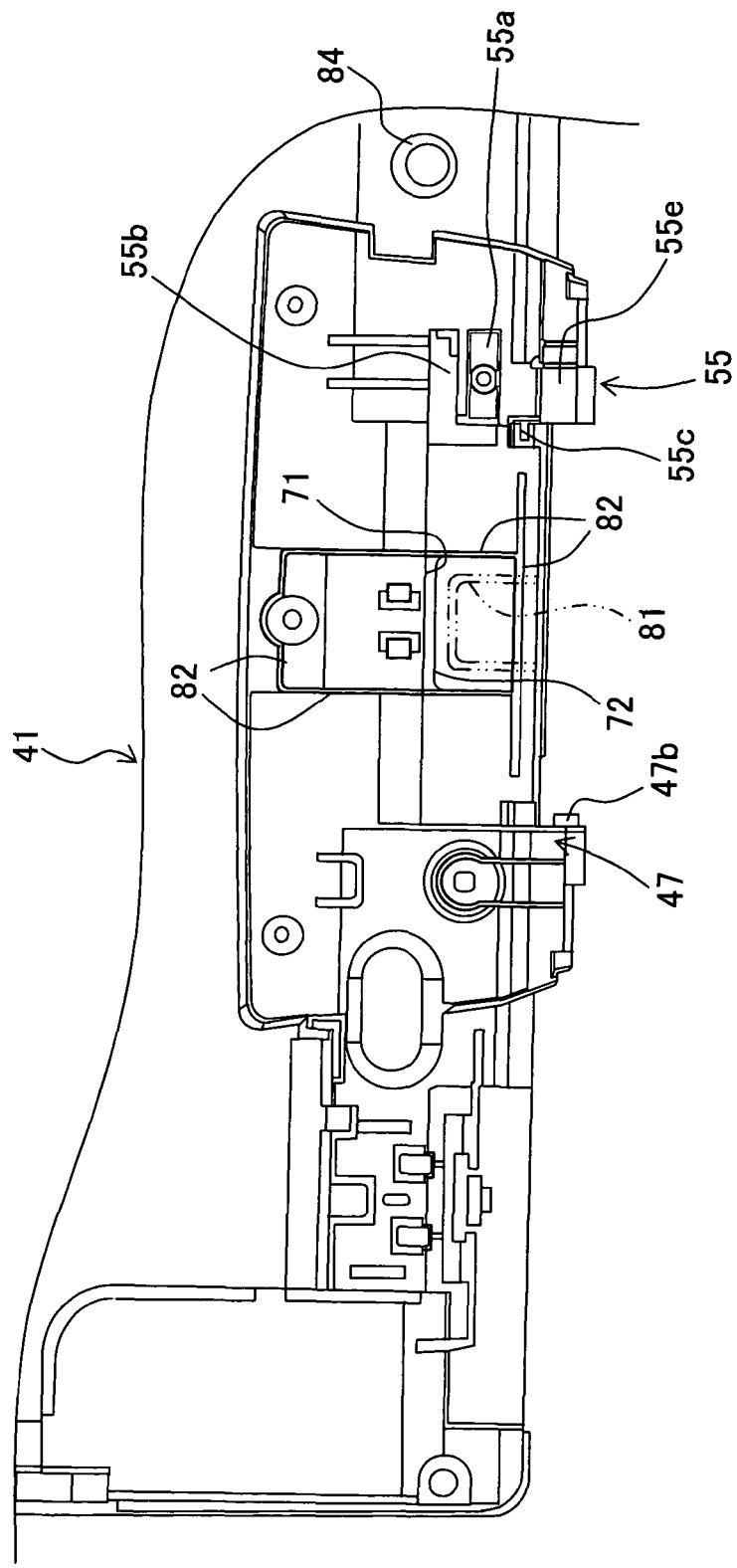
FIG. 7 is a plan view of a main portion of the upper cover of the image recording apparatus.

With reference to FIGS. 3 and 4, a main control board 33 for the recording section 12, facsimile communication, etc. is arranged on the upper surface of the partition plate 31. With reference to FIG. 6, the control board 33 is covered with a shield case constructing of an upper sheet metal member 32a and a lower sheet metal member 32b which are made of an iron sheet. The control board 33 is fixed to the lower sheet metal member 32b with machine screws. The lower sheet metal member 32b is fixed to the partition plate 31 with machine screws. With reference to FIGS. 3, 4 and 7, an upper cover 41 made of synthetic resin is fixed with machine screws to cover a portion over the shield case. An LCD (liquid crystal display) panel unit 37, which will be described later on, is attached pivotably on the upper cover 41. A switchboard 40 for a group of operation switches C and a group of operation switches D is fixed to a surface of the upper cover 41. The operation switches C and D are positioned on the right and left sides of the LCD panel unit 37, respectively. The switch board 40 for the groups of operation switches C and D is attached, together with the groups of operation switches C and D, to the back surface of a display cover 43. When the display cover 43 is mounted on and fixed to the upper cover 41, the switch board 40 is fixed between the upper cover 41 and the display cover 43.

Media connectors 35 and 36 are fixed to the upper surface of the main control board 33 and have slots 35a and 36a respectively, into which different types of recording media in the form of a card or a thin stick can be inserted. Each of the recording media may be Memory Stick (a registered trademark), Smart Media (a registered trademark), Compact Flash (a registered trademark), SD Memory Card (a registered trademark) or xD Picture Card (a registered trademark). With reference to FIGS. 1 to 4, the connector slots 35a and 36a are formed on the front side of the lower body 2 and positioned to be open on one of the right and left sides of the LCD panel unit 37 (the display panel unit), which will be described later on.

USB ports 42 for USB connectors for communication with peripheral devices are provided on one or both of the right and left sides of a portion in which the LCD panel unit 37 is arranged. For example, in this embodiment, the USB ports 42 are provided between the vicinity of the ink storage section 11 in the lower body 2 (the right end in FIGS. 2 to 4) and the rear of the LCD panel unit 37.

Figure 18A:
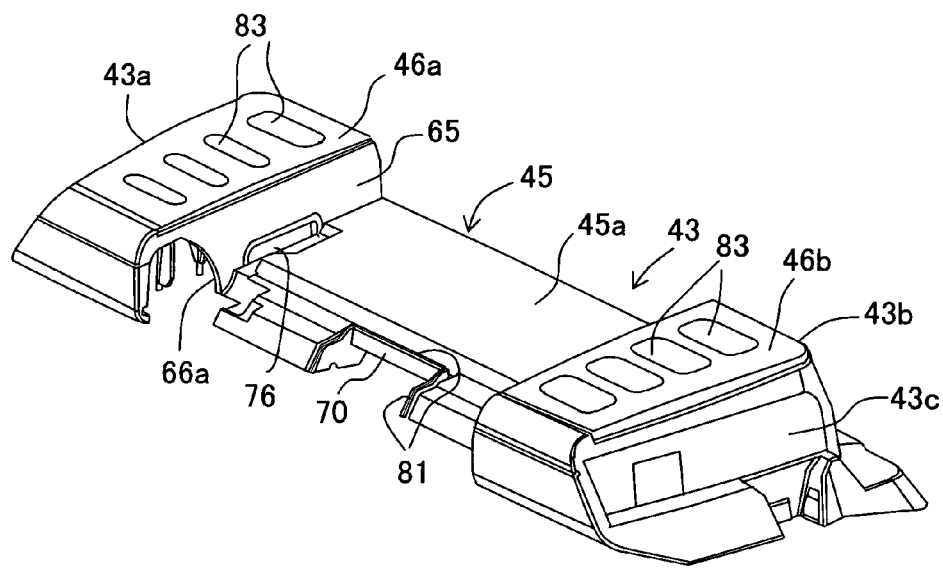
FIG. 18A is a right perspective view showing the upper surface of the display cover.
Figure 18B:
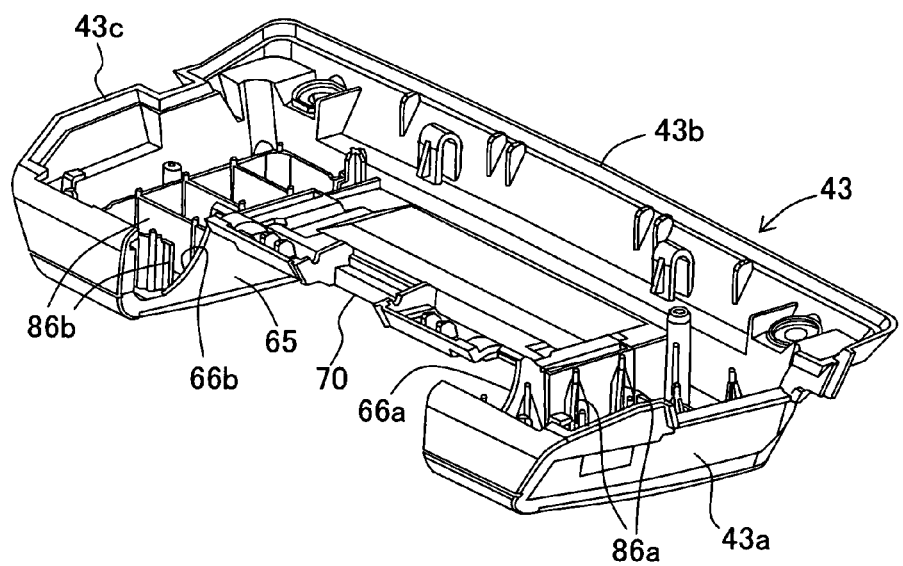
FIG. 18B is a bottom perspective view of the display cover.
Figure 19:
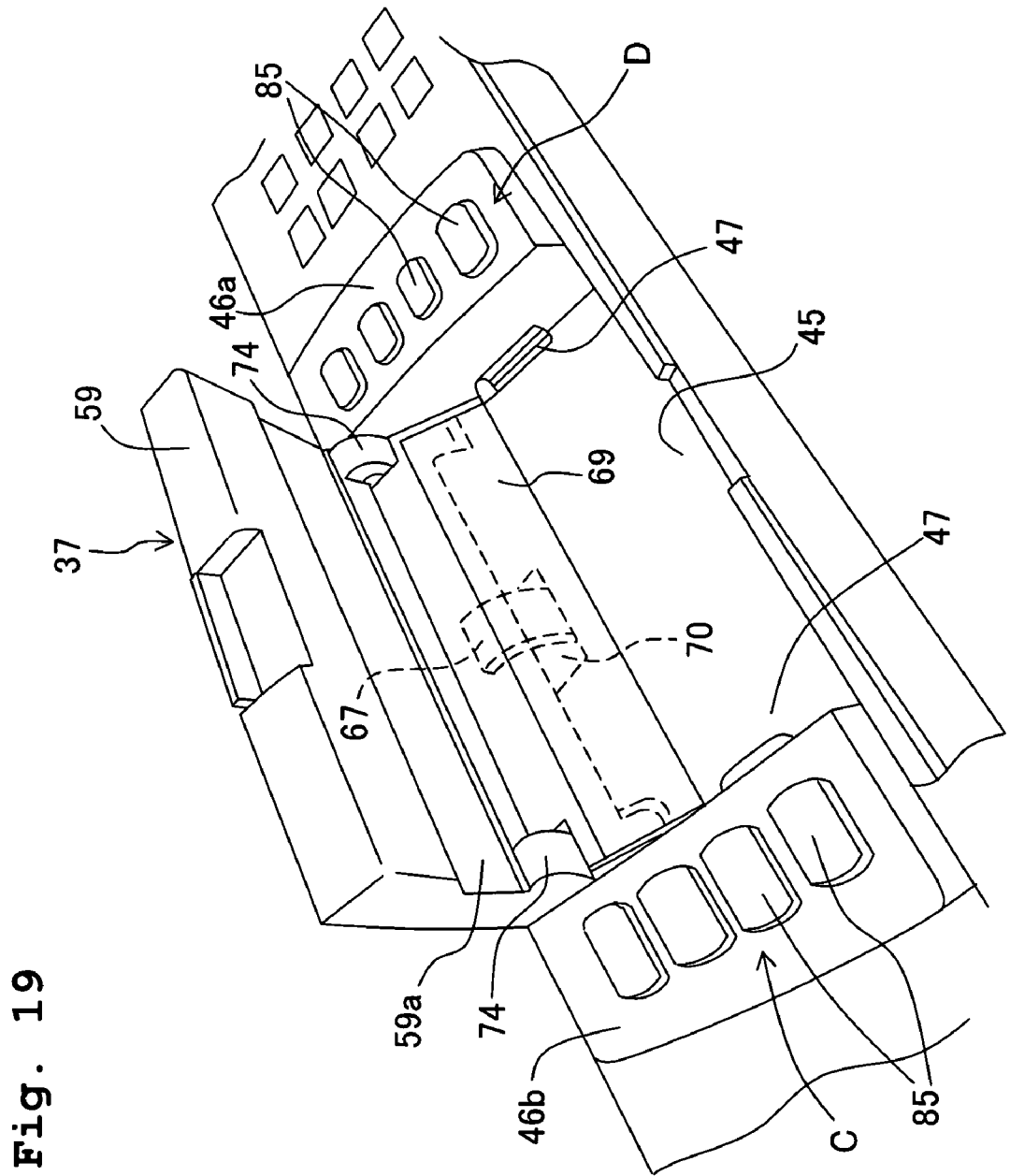
FIG. 19 is a perspective view of the LCD panel unit as seen from the back surface thereof in a state that the LCD panel unit is erected in a roughly vertical posture.

Next, the arrangement of and the mounting (attaching) structure for the LCD panel unit 37 will be described below. In the embodiment shown in FIGS. 1 and 2, the upper body 3 is so connected to the lower body 2 as to pivot up and down on the pivot axis on one of the right and left sides (the left side in FIG. 1) of the lower body 2. The display cover 43 is arranged detachably to the upper cover 41 and positioned near the front edge of the upper surface of the lower body 2 at a substantially central portion in the Y axis direction (in right and left direction of the recording apparatus 1 when a user faces the recording apparatus). Namely, these covers 41 and 43 have engaging mechanisms such as elastic engaging nails (claws) for fixing them together. As shown in FIGS. 18 and 19, the display cover 43, which is an injection molding of synthetic resin, includes entry key arrangement sections 46a and 46b rising integrally on its right and left sides respectively. The display cover 43 has an accommodation recess 45 formed between the entry key arrangement sections 46a and 46b. The accommodation recess 45 is open at its top and front. The LCD panel unit 37 can be accommodated in the accommodation recess 45. The entry key arrangement sections 46a and 46b, which are substantially rectangular in plan view, are provided with groups of operation switches C and D, which are entry keys for different functions. The group of operation switches C, disposed on the right as seen from the front of the recording apparatus 1, are entry keys which can be pressed selectively to display each of the functions. The group of operation switches C may be a photo capture entry key C1, a copy entry key C2, a facsimile entry key C3 and a scanner entry key C4, which are arranged in vertical arrays.

With reference to FIGS. 1 and 2, the upper body 3 has an opening 44 in the shape of a cutout formed in a front portion of its upper surface. The opening 44 enables the display screen of the LCD panel unit 37, the surfaces of the entry key arrangement sections 46a and 46b, and the groups of operation switches C and D to be exposed visibly when the upper body 3 is closed by pivoting on the pivot axis (on the left side in FIG. 1) toward the upper surface of the lower body 2. In this embodiment, the opening 44 has a shape of "]" (bracket) which is rectangular in plan view and open at its front side.

The upper surface of the upper body 3 is provided with operation panel switches E and F on the right and lefts sides, respectively, of the opening 44. The operation panel switches E and F are entry keys which can be pressed to instruct and display functions of the image recording apparatus 1, and which have different functions. In this embodiment, as shown in FIGS. 1 and 2, the operation panel switches E and F are positioned on the right and left sides respectively of the opening 44. The operation panel switches E are a start/stop entry key, a color copy start entry key, and a monochromatic copy start entry key, which are arranged in vertical arrays. The upper body 3 is also provided with a cross toggle entry key on the left side of the operation panel switches E, as shown in FIGS. 1 and 2. The cross toggle entry key can be pressed to search the fax numbers registered in advance, adjust the volume on the telephone receiver of the image recording apparatus 1, and the like. The operation panel switches F are ten keys for the entry of fax numbers etc., a management report output key, a fax number re-dialing entry key, etc.

Figure 17A:
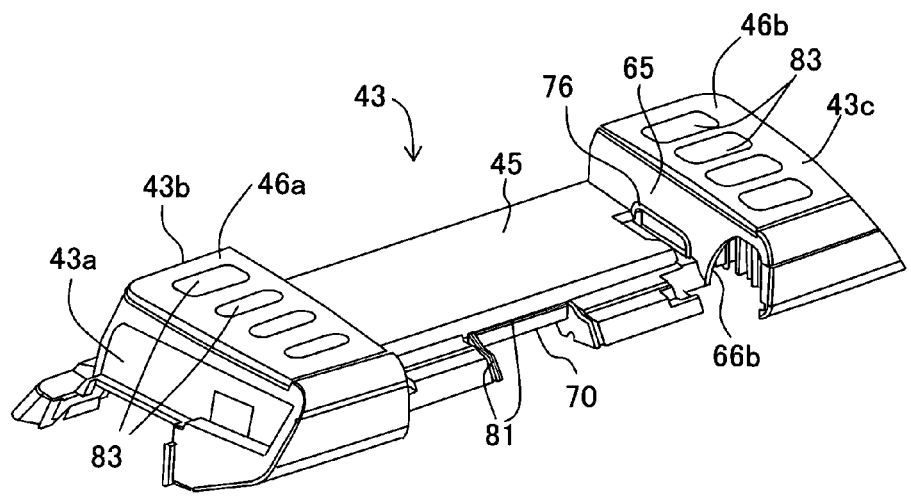
FIG. 17A is a left perspective view showing an upper surface of the display cover.
Figure 17B:
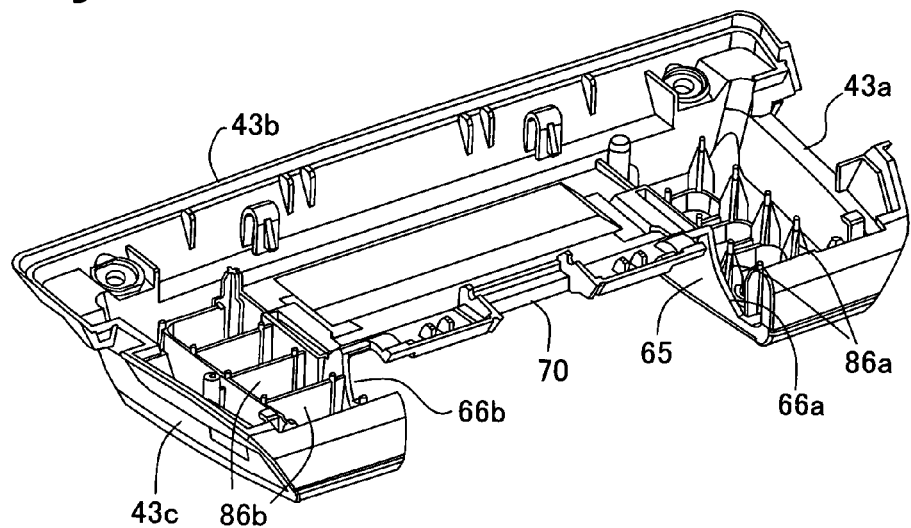
FIG. 17B is a bottom perspective view of the display cover.

With reference to FIGS. 2, 17 and 18, three sides 43a, 43b, 43c of the display cover 43 and three sides 44a, 44b, 44c of the opening 44 are formed to be trapezoidal, inclined outward toward the bottom of the image recording apparatus 1 so that, when the upper body 3 closes relative to the lower body 2, an operator's fingers would not be pinched between sharp edges at the places where the sides 44a, 44b and 44c of the opening 44 move close to the free edges of the LCD panel unit 37 and the sides 43a, 43b and 43c of the display cover 43.

With reference to FIG. 2, the groups of operation switches C and D are positioned at the entry key arrangement sections 46a and 46b as allowance areas, between which the LCD panel unit 37 is positioned. This prevents the three sides 44a, 44b and 44c of the opening 44 from interfering with the LCD panel unit 37 when the upper body 3 opens and closes relative to the lower body 2, with the LCD panel unit 37 erected upright so as to face the user's side.

Figure 8:
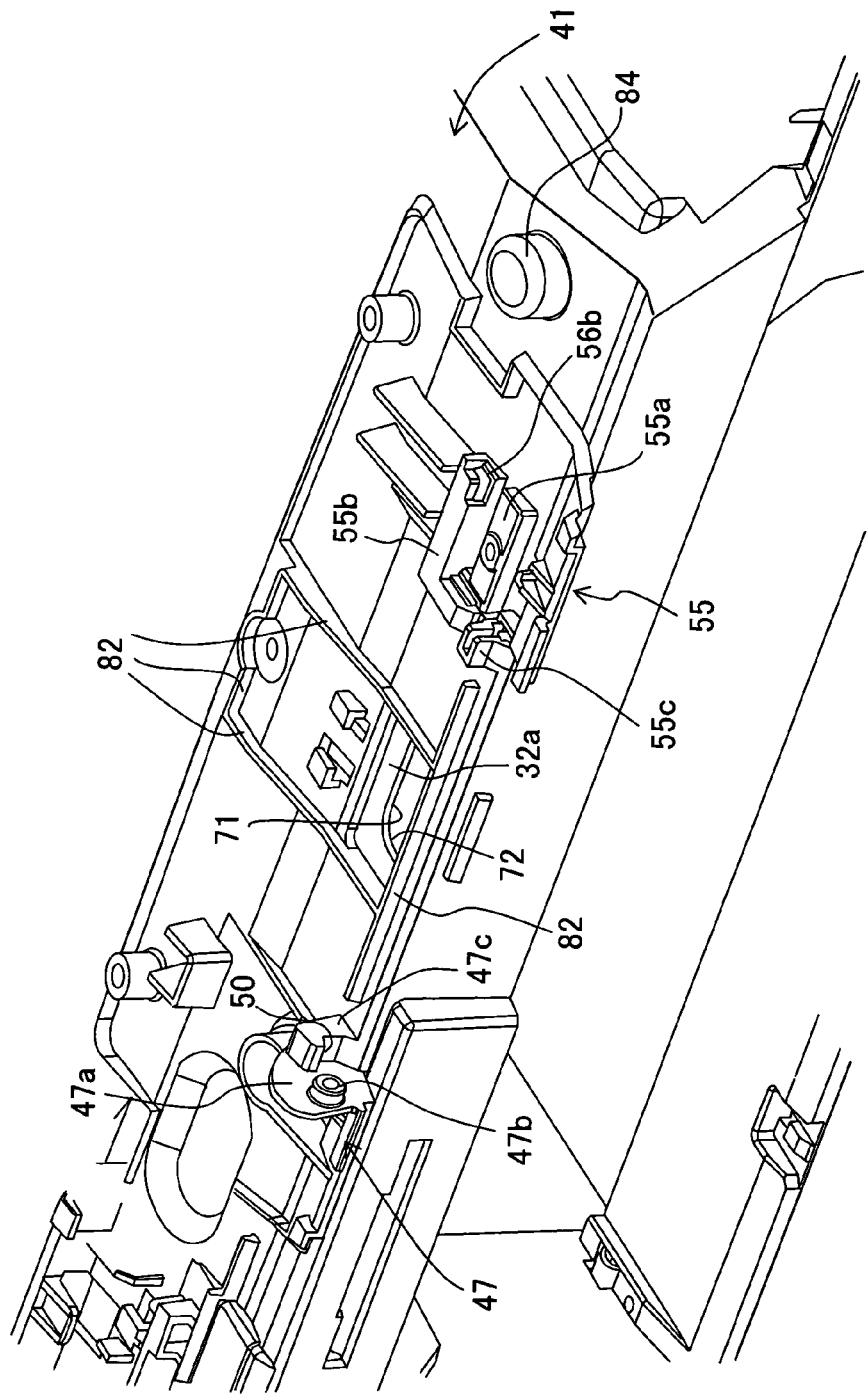
FIG. 8 is a partially cut-out enlarged perspective view of the main portion of the upper cover.
Figures 10A, 10B:
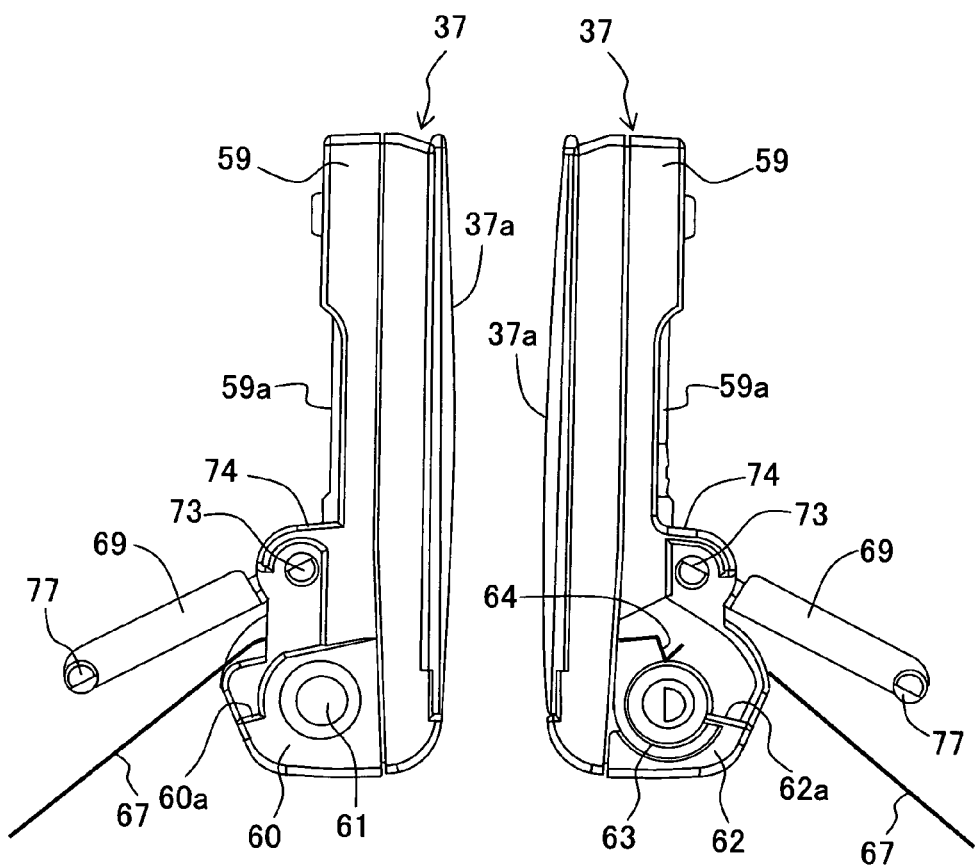
FIGS. 10A and 10B are a left side view and a right side view respectively of the LCD panel unit.
Figure 16:
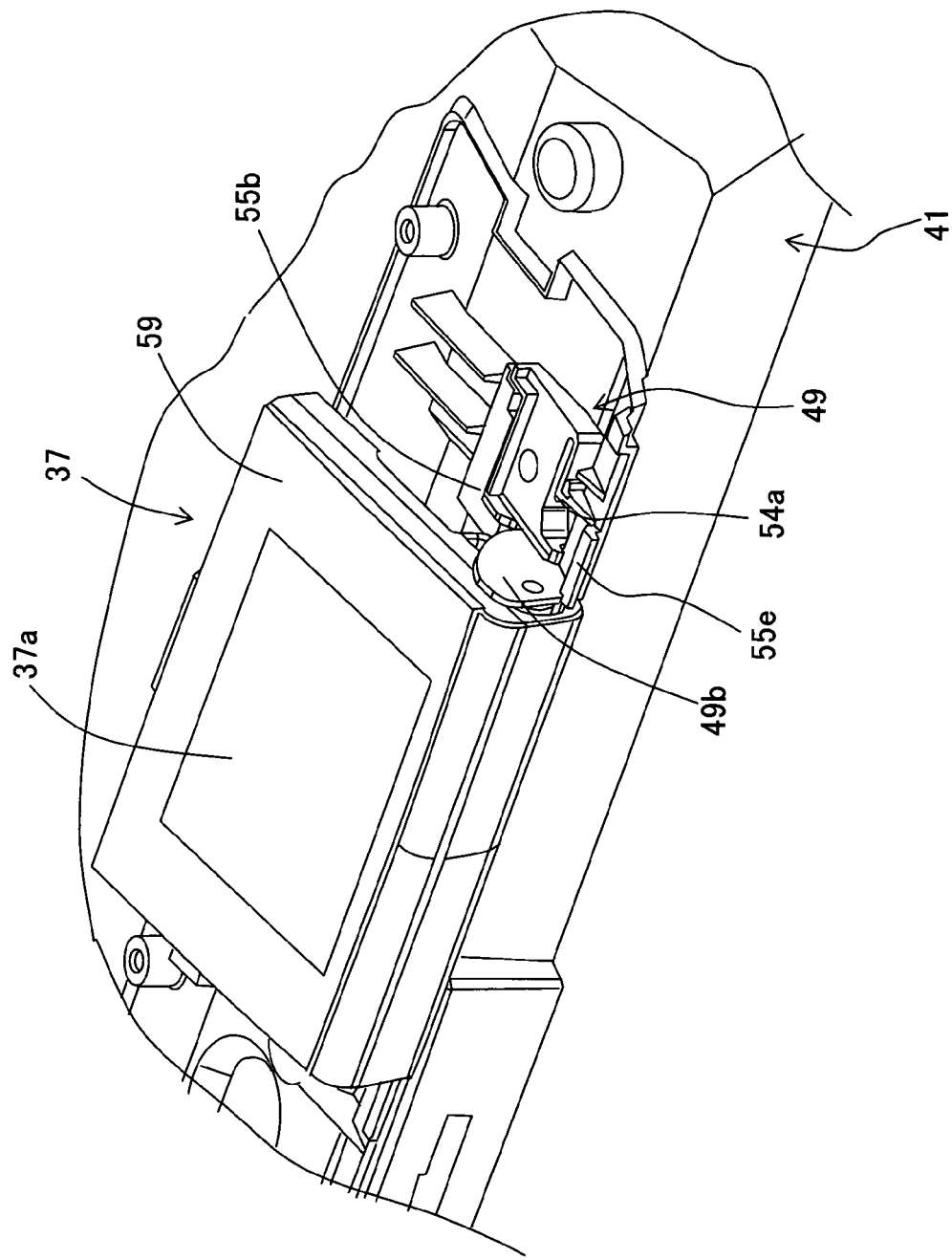
FIG. 16 is perspective view showing a state in which the movable hinge has been attached to a portion on one side of the LCD panel unit.

With reference to FIGS. 8 and 16, the base end (the front end) of the LCD panel unit 37 is supported by a hinge member (the pair of hinges) pair constructed of a right (left in FIGS. 8 and 16) hinge 47 and a left hinge 49 so that the LCD panel unit 37 can pivot around the base end. The LCD panel unit 37 is constructed such that the LCD panel unit 37 can pivot between an upright posture (position) and a laid-down posture (position) in which its display screen is substantially parallel with the upper surface of the display cover 43. The LCD panel unit 37 can be held in the laid-down and upright postures and inclined postures (positions) at suitable intervals between the two postures.

Figure 11:
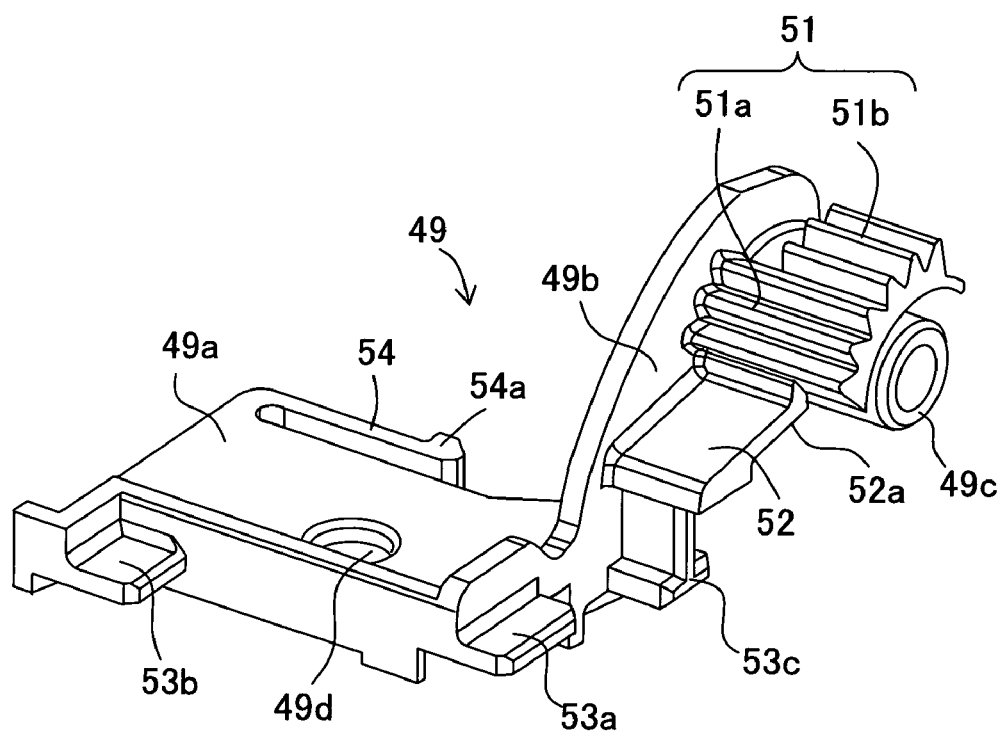
FIG. 11 is a perspective view of a movable hinge of the image recording apparatus.
Figures 12A, 12B, 12C, 12D:
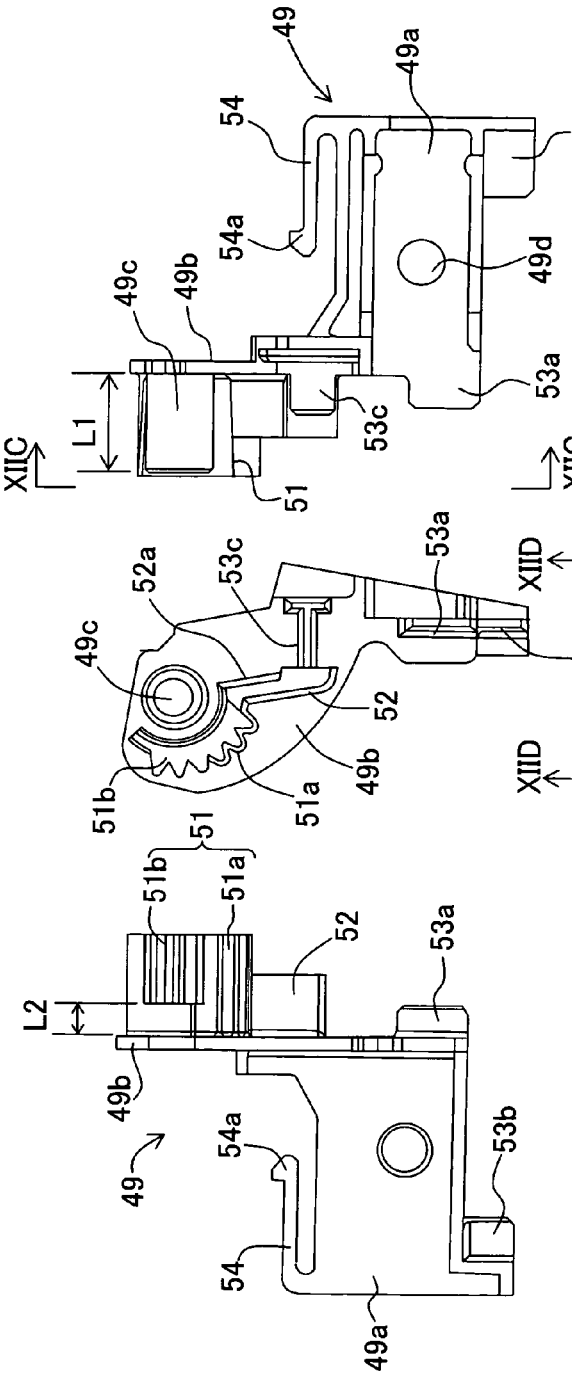
FIGS. 12A and 12B are a top view and a bottom view respectively of the movable hinge.
FIG. 12C is a side view taken along line XIIc-XIIc in FIG. 12B.
FIG. 12D is a view taken along line XIId-XIId in FIG. 12C.

The structure for attaching the LCD panel unit 37 pivotably will be described below in detail. As shown in FIGS. 4, 7 and 8, the hinge 47 of the pair, which is be referred hereinafter to as "fixed hinge 47", is formed integrally on the upper surface, of the upper cover 41, at a position near its front edge. With reference to FIGS. 11, 12 and 16, the hinge 49 of the pair, which is referred hereinafter to as "movable hinge 49", is formed unintegrally from (formed as a separate body from) the upper cover 41 and is attached detachably to the upper cover 41.

With reference to FIG. 8, the fixed hinge 47 has a flange 47a in the form of a plate, a cylindrical pin (axis) 47b, and a support 47c. The flange 47a extends (projects) upward from the upper cover 41. The pin 47b extends horizontally in the horizontal direction from the flange 47a. The support 47c is connected to the flange 47a and has a contact part 50 which is formed to protrude to the lower surface on the front side of the lower body 2. The contact part 50 serves as the contact part of a mechanism for preventing the LCD panel unit 37 from pivoting excessively upward.

As shown in FIGS. 11 and 12A-12D, the movable hinge 49, which is an integral injection molding of synthetic resin, has a base 49a in the form of a roughly rectangular block. A vertical flange 49b is formed at one end of the base 49a. A cylindrical axis 49c and a latch (latch nail) 51 extend horizontally from the flange 49b away from the base 49a. A length L1 of the axis 49c is roughly twice the length of the pin 47b of the fixed hinge 47. The latch 51 is formed to be fan-shaped (within a range of circular shape) and is positioned outside the cylindrical surface of the axis 49c. The latch 51 has a first latch part 51a and a second latch part 51b. The first latchpart 51a extends from the outer surface of the flange 49b and is equal in length to the axis 49c. One end of the second latch part 51b is flush with the outer ends of the first latch part 51a and the axis 49c. The other end of the second latch part 51b is spaced at a predetermined length L2 shorter than the length L1 from the outer surface of the flange 49b. The second latch part 51b is connected to a flat click-slide part 52.

The base 49a has a first engagement nail 53a and a second engagement nail 53b which are flat. The first engagement nail 53a protrudes horizontally from the front end (near the outer surface of the flange 49b) of the base 49a. The second engagement nail 53b protrudes horizontally from the rear end of one side of the base 49a. A third engagement nail 53c in the shape of an inverted "T" in a sectional view protrudes one side of the lower surface of the click-slide part 52, near the first engagement nail 53a. The three engagement nails 53a to 53c protrude in parallel with the axes of bearings 61 and 63 and toward the bearing 63. The bearings 61 and 63 are in the shape of holes, which are attachment-objective parts formed on the right and left sides of the LCD panel unit 37. The base 49a also has an elastically deformable elastic part 54 extending from the rear end on other side of the base 49a in the same direction as the second engagement nail 53b protrudes. The elastic part 54 has an anti-disengagement nail 54a formed on its front end. The base 49a further has a hole 49d formed therethrough for engaging with a machine screw (not shown). The click-slide part 52 is connected to the upper surface of the third engagement nail 53c in the shape of an inverted T in a sectional view. The lower surface side of the click-slide part 52 serves as the contact part 52a of a mechanism for preventing the LCD panel unit 37 from disengaging upward.

Figure 13:
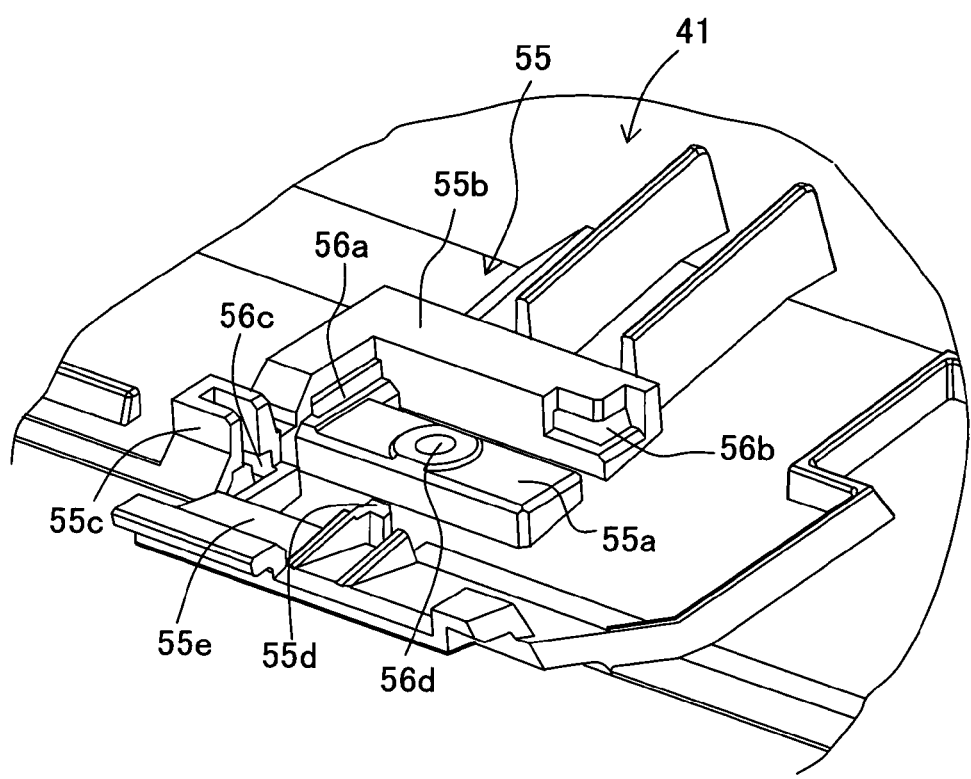
FIG. 13 is an enlarged perspective view of an attachment section to which the movable hinge is to be attached.

The upper cover 41 has a fixing section 55 (engaging part), which enables engagement and disengagement of the movable hinge 49. The structure of the fixing section 55 will be described below. As shown in FIGS. 8 and 13, the fixing section 55 is arranged in a position at which the fixing section 55 faces the fixed hinge 47 and is spaced from the fixed hinge 47 at a distance nearly equal to the width of the LCD panel unit 37. The fixing section 55 includes a placement block 55a, a contact block 55b L-shaped in plan view, an engagement block 55c, and an anti-disengagement block 55d which protrude integrally from the upper cover 41. The base 49a of the movable hinge 49 is placed on the placement block 55a. Side surfaces of the base 49a can come into contact with the contact block 55b. The placement block 55a has a hole 56d formed therethrough for engagement with the machine screw mentioned above. The contact block 55b has a first contact recess 56a and a second contact recess 56b, into which the first engagement nail 53a and the second engagement nail 53b can respectively be inserted to move horizontally, and which prevent them from moving upward. The engagement block 55c has a third contact recess 56c, into which the third engagement nail 53c can be inserted to move horizontally, and which prevents it from moving upward. These contact recesses 56a to 56c correspond to key receiving parts for the first to third engagement nails 53a to 53c, respectively.

Further, it is constructed such that when the movable hinge 49 is advanced in a direction which is a horizontal direction and approaching toward the bearing 63, the anti-disengagement nail 54a engages with the anti-disengagement block 55d, thereby preventing the movable hinge 49 from retreating in opposite direction.

The upper cover 41 has a support block 55e protruding integrally from its front edge and positioned forward from the anti-disengagement block 55d. The support block 55e can contact and support the lower end surface of the flange 49b of the movable hinge 49.

Next, the structure of the LCD panel unit 37 will be described below. As shown in FIGS. 9A, 9B, 10A, 10B, etc., the LCD panel unit 37 has a case 59 which is roughly rectangular in front view. A display screen 37a is formed on the front surface of the case 59 and has a display area (about 42 mm×54 mm in this embodiment) which is also roughly rectangular in front view and is large enough to display a color image. The case 59 has bosses 60 and 62 formed on lower portions of both side surfaces, respectively of the case 59. In this embodiment, the bosses 60 and 62 are formed on the left (FIG. 10A) and right (FIG. 10B) sides respectively of the case 59 when the display screen 37a is considered as the front side. The boss 60 has a bearing 61 formed in it in the form of a cylindrical hole, into which the pin 47b of the fixed hinge 47 can be inserted. The boss 62 has a bearing 63 formed on it in the form of a cylinder, into which the axis 49c of the movable hinge 49 can be inserted. The case 59 is supported pivotably by the inserted pins 47b and 49c.

Figure 14:
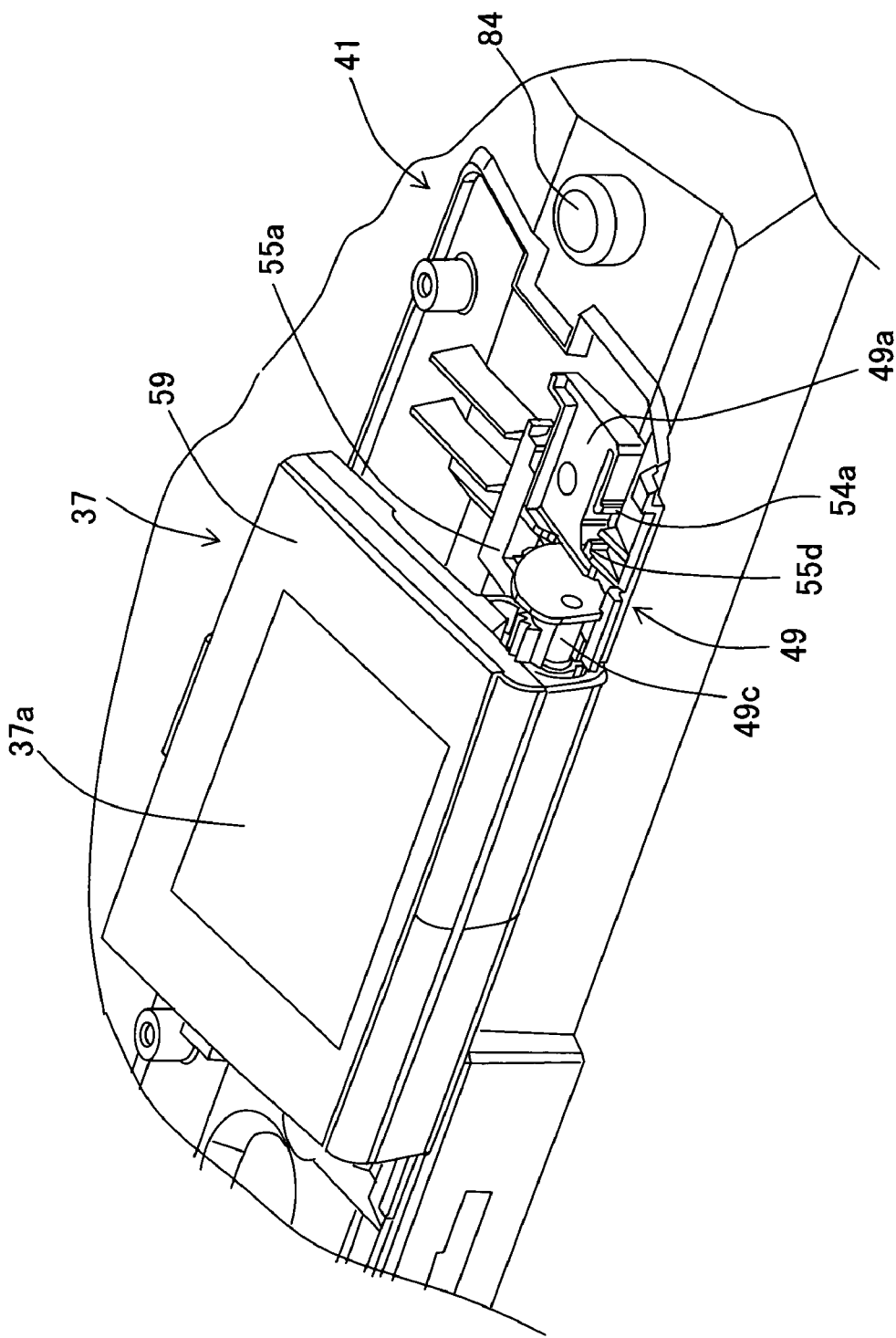
FIG. 14 is a perspective view showing an intermediate state that the movable hinge is being attached.
Figure 15:
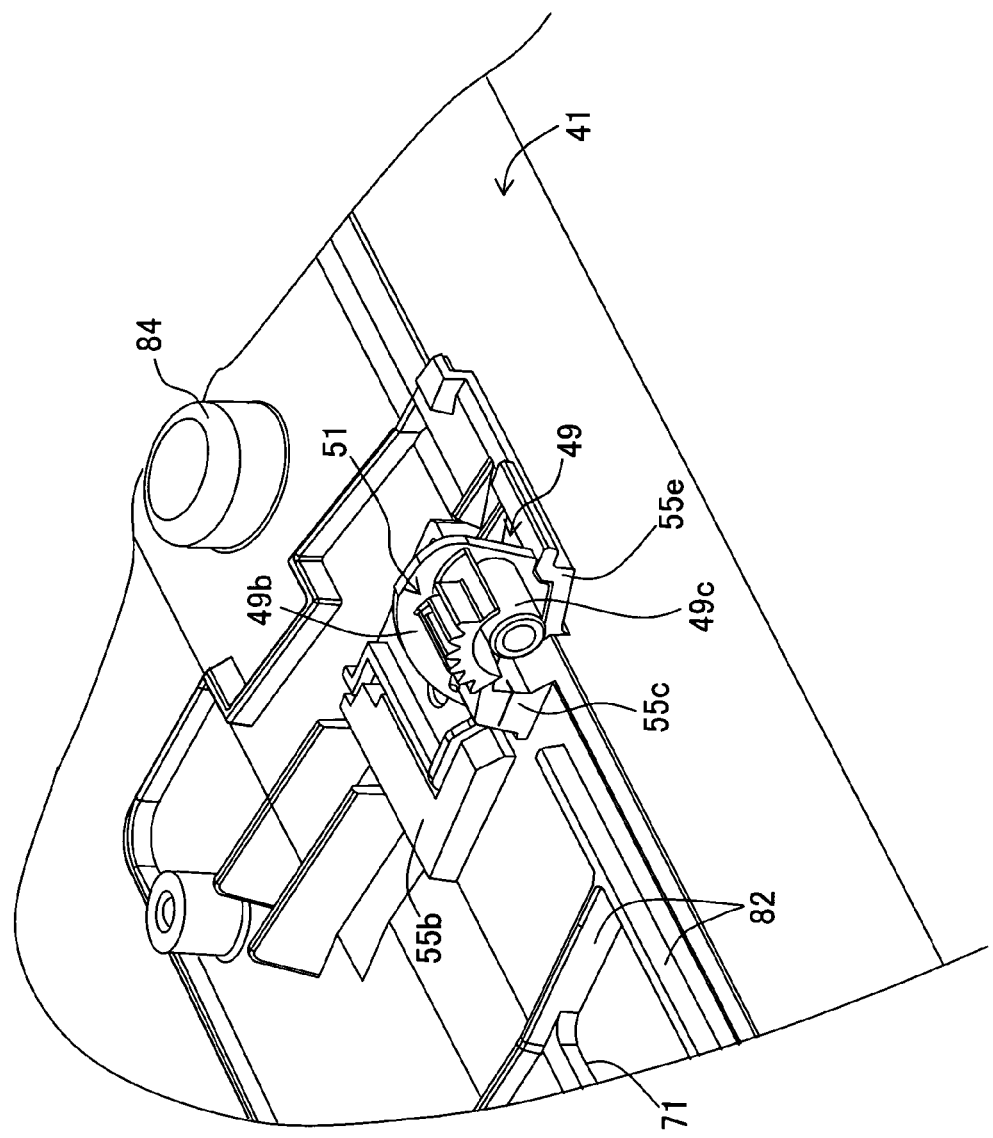
FIG. 15 is perspective view showing a state in which the movable hinge is attached in the attachment section, with the LCD panel unit omitted.

In order that the LCD panel unit 37 can be attached pivotably upwardly and downwardly (in erecting and lying manner) on the fixed hinge 47 and the movable hinge 49, first, the left bearing 61 of the LCD panel unit 37 is brought into engagement with the pin 47b of the fixed hinge 47. Subsequently, with reference to FIGS. 13 and 14, the base 49a of the movable hinge 49 is placed on a portion of the placement block 55a of the fixing section 55. At this time, the movable hinge 49 is so oriented that its axis 49c faces the bearing 63 on the right side surface of the LCD panel unit 37. Subsequently, the movable hinge 49 is slid to the left in FIG. 14 (in the direction in which the axis 49c approaches the bearing 63), so that the first to third engagement nails 53a, 53b and 53c engage with the first to third contact recesses 56a, 56b and 56c, respectively. The movable hinge 49 is further pushed in this direction, so that the anti-disengagement nail 54a comes into compressive contact with the rear end of the anti-disengagement block 55d, deforming the elastic part 54 against its elasticity. As a result, the anti-disengagement nail 54a engages with the anti-disengagement block 55d, so that the movable hinge 49 cannot retreat from (cannot be disengaged from) the fixing section 55 (FIGS. 15 and 16). For easy understanding, FIG. 15 shows the movable hinge 49 as set on the fixing section 55, with the LCD panel unit 37 removed.

The engagement of the first to third engagement nails 53a to 53c with the first to third contact recesses 56a to 56c completely regulates the upward and downward movement of the movable hinge 49, tightly fixing the movable hinge 49 and firmly attaching the movable hinge 49 to the upper cover 41. The base 49a and the placement block 55a are fixed together by the machine screw for further reinforcement.

The boss 60 of the LCD panel unit 37 has a stepped portion (contact-objective part) 60a formed at its one end. The boss 62 of the LCD panel unit 37 has a stepped portion (contact-objective part) 62a formed at its one end. When the LCD panel unit 37 supported pivotably by the hinges 47 and 49 is substantially in the upright posture, the stepped portions 60a and 62a are in contact with the contact parts 50 and 52a of the hinges 47 and 49 respectively. This regulates the forward pivoting of the LCD panel unit 37 and keeps it from falling away from the image recording apparatus 1. Accordingly, even if a user lifts the LCD panel unit 37, it neither pivots further nor disengages accidentally.

Figure 24:
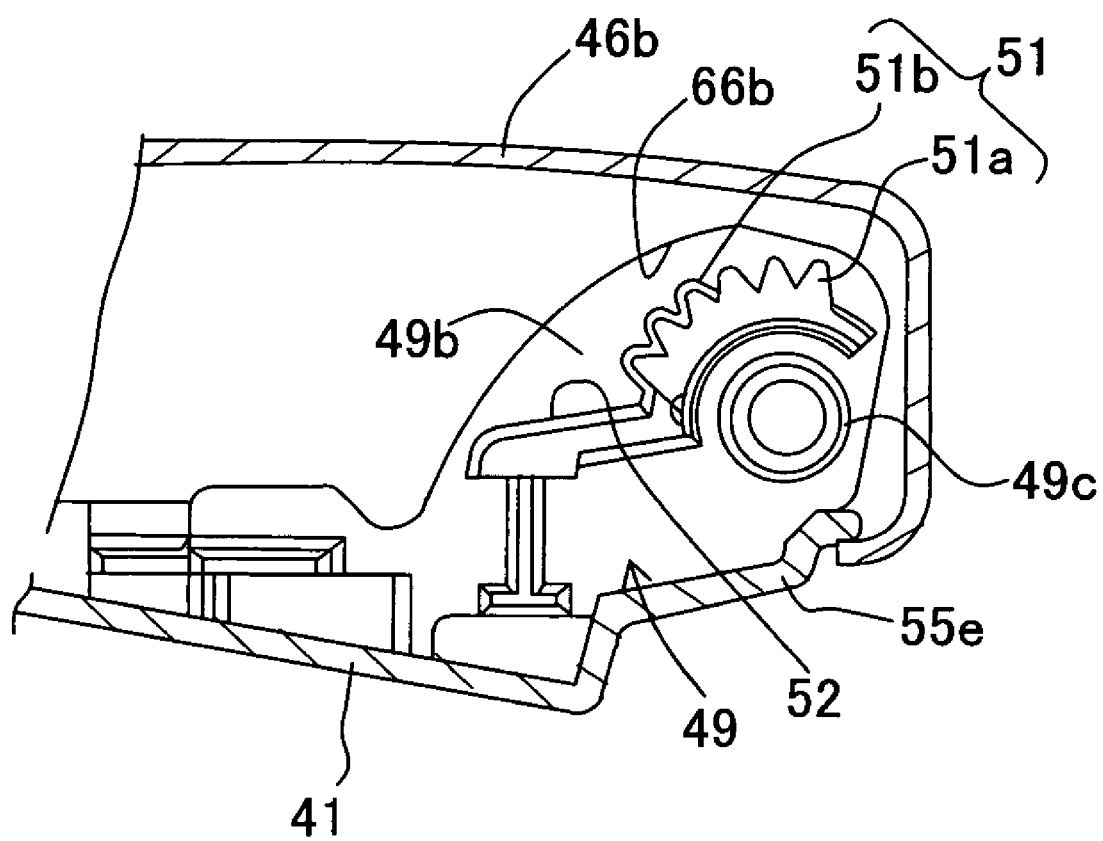
FIG. 24 shows a state in which a flange 49 of a movable hinge 49 is fitted to a cutout 66b.

With the LCD panel unit 37 attached between the hinges 47 and 49, as stated above, and erected substantially in the upright posture, the switch board 40 is fixed in a predetermined position on the upper cover 41, and the display cover 43 to which the switch board 40 has been fixed or assembled, is fixed on the rear end side of the LCD panel unit 37. The entry key arrangement sections 46a and 46b of the display cover 43 have cutouts 66a and 66b respectively formed through their respective inner walls 65, between which the accommodation recess 45 is formed. The cutouts 66a and 66b are identical in shape with the edges of the flanges 47a and 49b of the hinges 47 and 49, respectively. The edges of the flanges 47a and 49b engage closely with the cutouts 66a and 66b respectively. This keeps the appearance of the image recording apparatus 1 from being spoiled and contributes toward improving the fixing strength of the hinges 47 and 49. FIG. 24 shows a state in which the flange 49b of the movable hinge 49 is fitted to the cutout 66b.

Further, switch holes 83 are formed through the surfaces of the pair of the entry key arrangement sections 46a and 46b in the display cover 43. The switch holes 83 for arranging the groups of operation switches C and D therein, respectively (see FIGS. 17 and 18). Furthermore, ribs 86a, 86b are formed integrally with the inner surfaces of the entry key arrangement sections 46a and 46b. In the ribs 86a, 86b, switch bodies 85 (see FIG. 19) can be arranged corresponding to the switch holes 83, respectively, such that the switch bodies 85 are movable in up and down direction. Among these ribs, the ribs 86b in the entry key arrangement section 46b, which is disposed at the right side when the image recording apparatus 1 is seen at the side of the user facing the apparatus, are formed to have a partition wall shape which is substantially rectangular in a bottom view, such that the ribs 86b partition the inner space of the entry key arrangement section 46b into portions at which the switch bodies 85 are arranged therein, respectively (see FIGS. 17B and 18B). On the other hand, LEDs (light-emitting diodes) 87 are provided on the surface of the switch board 40 as light sources corresponding to the switch portions respectively. Each of the LEDs 87 is arranged to correspond to one of the partitioned spaces partitioned by the ribs 86b (see FIG. 3). Accordingly, it is constructed such that, when the LEDs 87 emit light, the light is irradiated only upwardly via the switch bodies 85 which are translucent or transparent.

As described above, when the display cover 43 is fixed to and cover the fixed hinge 47 and the movable hinge 49, the surfaces or end surfaces of the ribs 86a, 86b contact with the back surfaces of the flange 47a of the fixed hinge 47 and the flange 49b of the movable hinge 49. Accordingly, the flanges 47a, 49b are restrained (regulated) by the ribs 86a, 86b such that the flanges 47a, 49b cannot be displaced for widening the distance therebetween. In particular, the ribs 86b in the shape of partition wall are hardly warped and deformed. Accordingly, it is possible to obtain a substantial effect of holding the distance between the flanges 47a and 49b to be constant (maintaining the flanges 47a and 49b in the fixed state).

Figure 22:
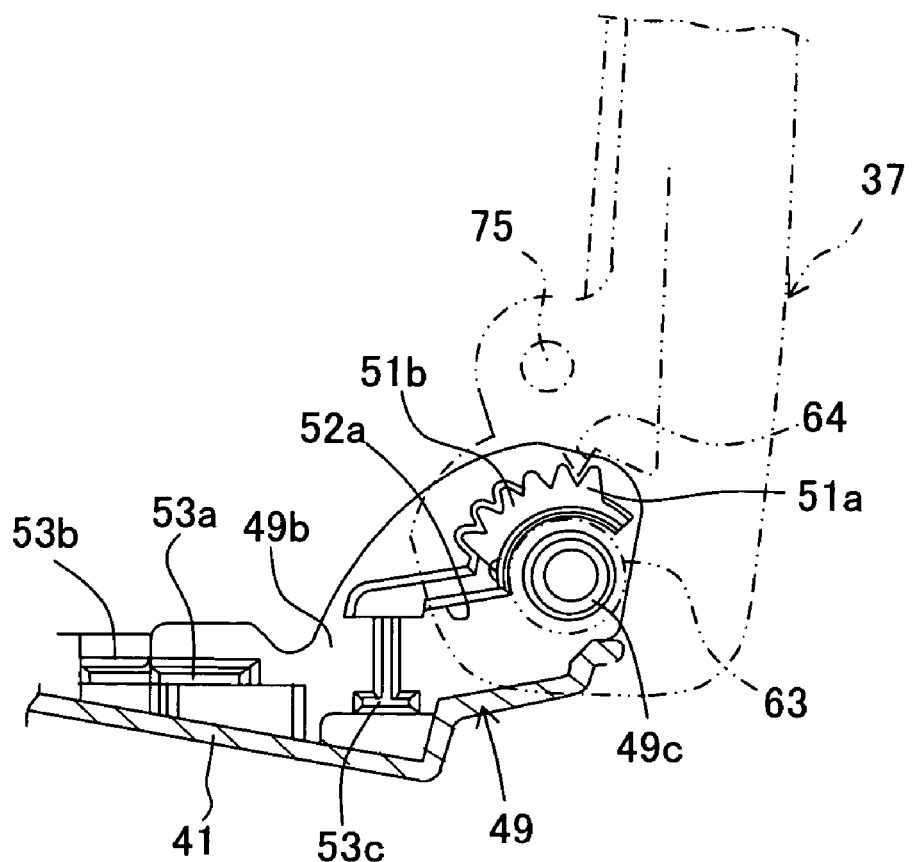
FIG. 22 is a drawing for explaining a state in which the LCD panel unit is in the upright posture as viewed from a side surface of the movable hinge.
Figure 23:
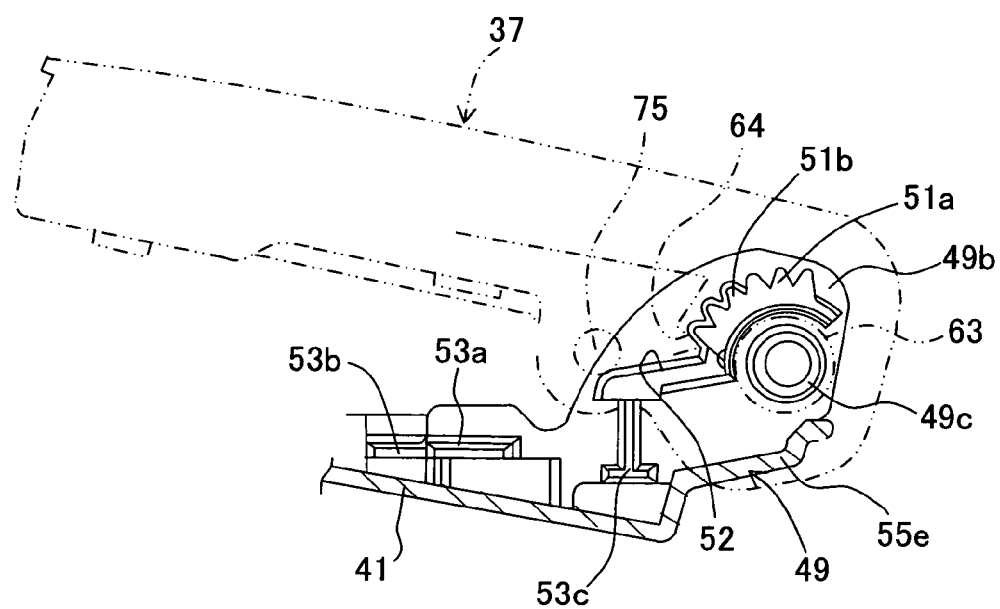
FIG. 23 is a drawing for explaining a state in which the LCD panel unit is in the laid-down posture as viewed from the side surface of the movable hinge.

The case 59 of the LCD panel unit 37 has a click 64 in the form of a metal plate spring, one end (base end) of which is fixed to the other side surface of the case 59 by screws or the like. The free end (tip end portion) of the click 64 is arranged to face a portion of the outer periphery of the bearing 63 of the LCD panel unit 37. With the axis 49c of the movable hinge 49 engaging with the bearing 63, the outer periphery of the bearing 63 and the arcuate inner peripheral surface of the latch 51 of the movable hinge 49 face each other. At this time, the click 64 engages elastically with the teeth of one of the latch parts 51a and 51b. This structure is a latch mechanism. This structure makes it possible to adjust the inclination angle of the LCD panel unit 37 at suitable intervals between the laid-down posture (FIG. 1) in which the display screen of the LCD panel unit 37 is substantially flush with the upper surfaces of the entry key arrangement sections 46a and 46b, and the upright posture in which the display screen is substantially vertical relative to a horizontal plane. This structure also makes it possible to hold the LCD panel unit 37 in the various postures at these intervals (see FIGS. 2, 22 and 23).

As described above, the first latch part 51a and the second latch part 51b, sliding with the click 64 in the form of a metal plate spring, are easily worn. Therefore, when the movable hinge 49 is entirely formed by using a high-functional synthetic resin material having wear-resistant property and sliding-resistant property (with low friction property) such as nylon (polyamide) resin, polyacetal resin, polycarbonate resin, or the like, the durability is enhanced. In addition, by using a synthetic resin having a low thermal shrinkage for forming the injection molding, it is possible to improve the size precision in the axis and the bearing and the size precision in the engaging recesses and the engaging parts (nails), thereby preventing the rattling between the parts and to ensure the firm fixing therebetween.

When the posture of the LCD panel unit 37 becomes more like the laid-down posture at which the LCD panel unit 37 is substantially parallel with the bottom plate 45a of the accommodation recess 45 of the display cover 43, the click 64 of the LCD panel unit 37 passes over the teeth of the second latch part 51b of the movable hinge 49 and reaches (positioned in) the click-slide part 52 of this hinge (see FIG. 23), so that a user can turn the LCD panel unit 37 smoothly without feeling clicking.

A description will be provided below of the structure of the flexible flat (FF) cable 67 at the LCD panel unit 37 and the covering member 69 for protecting the cable.

The FF cable 67 extends outward from a portion in the vicinity of the lower edge in the back surface side of the case 59 of the LCD panel unit 37. With reference to FIGS. 17A-18B, 19, etc., the bottom plate 45a of the accommodation recess 45 of the display cover 43 has a first guide opening 70 in the shape of a cutout formed in a shape of "]" in a plan view, on the front side of the display cover 43. With reference to FIGS. 7, 8, 15, etc., the upper cover 41 has a second guide opening 71 in the shape of a roughly rectangular hole formed therethrough so as to overlap with the first guide opening 70 disposed above the second guide opening 71. With reference to FIGS. 6, 7 and 8, the upper sheet metal member 32a of the shield case has a third guide opening 72 in the shape of a cutout formed in a shape of "]" in a plan view, on its front side below the second guide opening 71. The FF cable 67 extends (is guided) through these three guide openings 70 to 72 and is connected to the main control board 33 as an electrical component. Signals can be transmitted from the main control board 33 through the FF cable 67 to the LCD panel unit 37 so that images can be displayed on the LCD panel unit 37.

With reference to FIGS. 9A to 10B, the covering member 69 is an integral molding of flexible synthetic resin in the form of a flat plate. The covering member 69 has a pair of pivot pins 73 extending outwardly in mutually opposite directions from the base end of the covering member 69. The case 59 of the LCD panel unit 37 has a pair of bosses 74 formed on its back surface above the position where the FF cable 67 extends from the case 59. Each boss 74 has a cylindrical bearing hole 75 formed therethrough, in which one of the pivot pins 73 is supported rotatably.

Figure 20A:
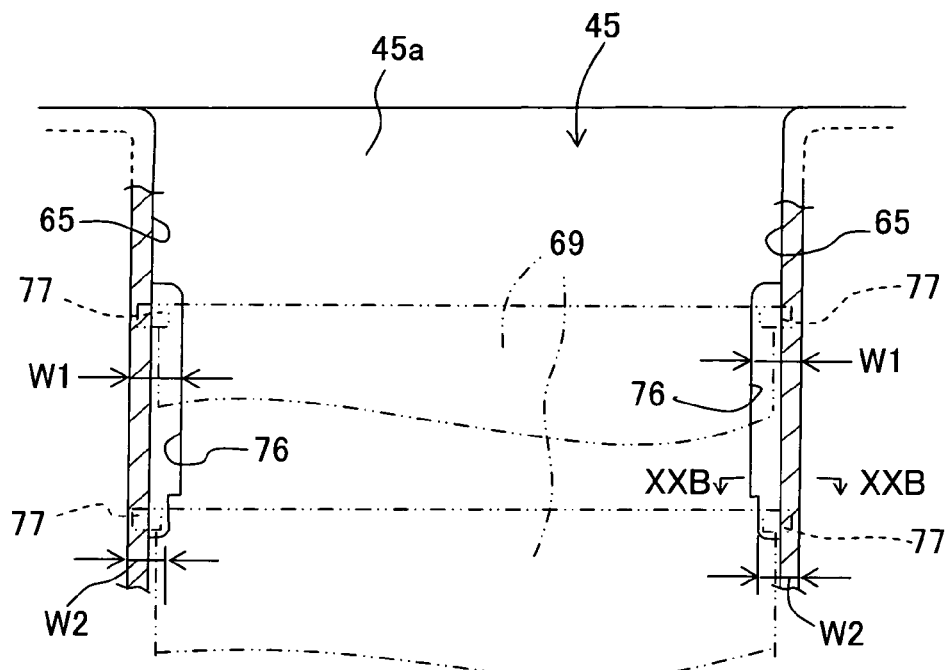
FIG. 20A is a plan view showing the relationship between a covering member and a guide groove.
Figure 20B:
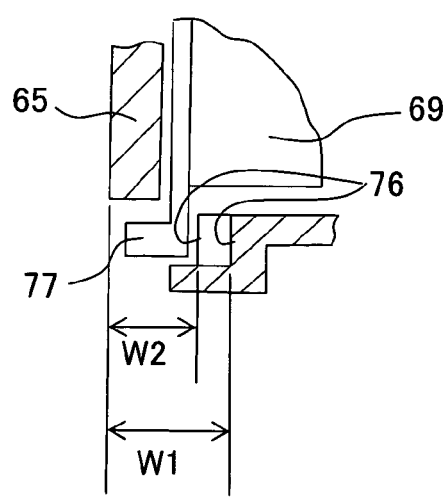
FIG. 20B is an enlarged sectional view taken along line XXb-XXb in FIG. 20A.

With reference to FIGS. 17A to 20B, the display cover 41 has a pair of guide grooves 76 each formed in a corner portion between the bottom plate 45a of the accommodation recess 45 and the inner wall 65 of one of the entry key arrangement sections 46a and 46b. The guide grooves 76 extend along the forward and backward direction (X-axis direction) in the lower body 2. As shown in FIGS. 20A and 20B, each of the guide grooves 76 is constructed of a rear side portion and a front end portion. A width W1 of the rear side portion is greater than a width W2 of the front end portion. The covering member 69 has a pair of guide pins 77 extending outwardly in a mutually opposite directions from a second end (hereinafter referred to as "free end") of the covering member 69. Each of the guide pins 77 can slide along one of the guide grooves 76.

Accordingly, when the LCD panel unit 37 assumed a posture in which the LCD panel unit 37 is erected substantially in the upright state (see FIG. 2), as shown in FIG. 19, the covering member 69 is inclined in a downwardly rearward direction (away from the LCD panel unit 37) at about 45 degrees, with its guide pins 77 positioned at the front ends of the guide grooves 76. Accordingly, the FF cable 67 and the first guide opening 70 are positioned between and covered with the back surface of the case 59 of the LCD panel unit 37 and the covering member 69. When the LCD panel unit 37 is laid down in the accommodation recess 45, with the display screen 37a being flush with the surfaces of the entry key arrangement sections 46a and 46b, as shown in FIG. 1, the free end side (the side of the guide pins 77) of the covering member 69 is positioned near the rear ends of the guide grooves 76, with the covering member 69 accommodated substantially in parallel with the back surface of the case 59.

This makes the LCD panel unit 37 low in height when it is in the laid-down posture (position). In addition, the covering member 69 does not move into the lower body 2, as is the case with conventional covers which protect FF cables. This makes it unnecessary to preset a vertical space for the covering member 69, so that the image recording apparatus 1 can be compact. In this embodiment, with reference to FIGS. 9A-10B and 19, the case 59 has a recess 59a formed on its back surface. When the LCD panel unit 37 is in the laid-down state, the covering member 69 is positioned completely within the recess 59a, so that the LCD panel unit 37 is much lower in height. In addition, the FF cable 67 and the first guide opening 70 are positioned between and covered with the back surface of the case 59 and the covering member 69. Thus, the covering member 69, which is attached to the case 59 of the LCD panel unit 37 such that the covering member 69 can be accommodated in the case 59, covers and protects the FF cable 67 and the first guide opening 70, regardless of the angular posture the panel unit 37 is assuming. This prevents users from touching the FF cable 67 carelessly and keeps trash, dust and other foreign bodies from entering the image recording apparatus 1 through the fist guide opening 70.

The pivot pins 73 and guide pins 77 of the covering member 69 are roughly semi-cylindrical having a cross-section in which the round axis is partially cut out. Because the covering member 69 is flexible as described above, its middle portion in the left and right direction can be curved so that the distance between the pivot pins 73 and the distance between the guide pins 77 can be shortened. This makes it easy to insert and attach the pins 73 and 77 into the cylindrical bearing holes 75 and the guide grooves 76, respectively. With reference to FIGS. 20A and 20B, the width W2 of the front end portions of the guide grooves 76 is formed to be narrow as described above. Accordingly, when the LCD panel unit 37 is in the upright posture, it is impossible to shorten the distance between the guide pins 77 even if the covering member 69 is curved. This keeps the guide pins 77 from disengaging accidentally from the guide grooves 76.

Figure 21:
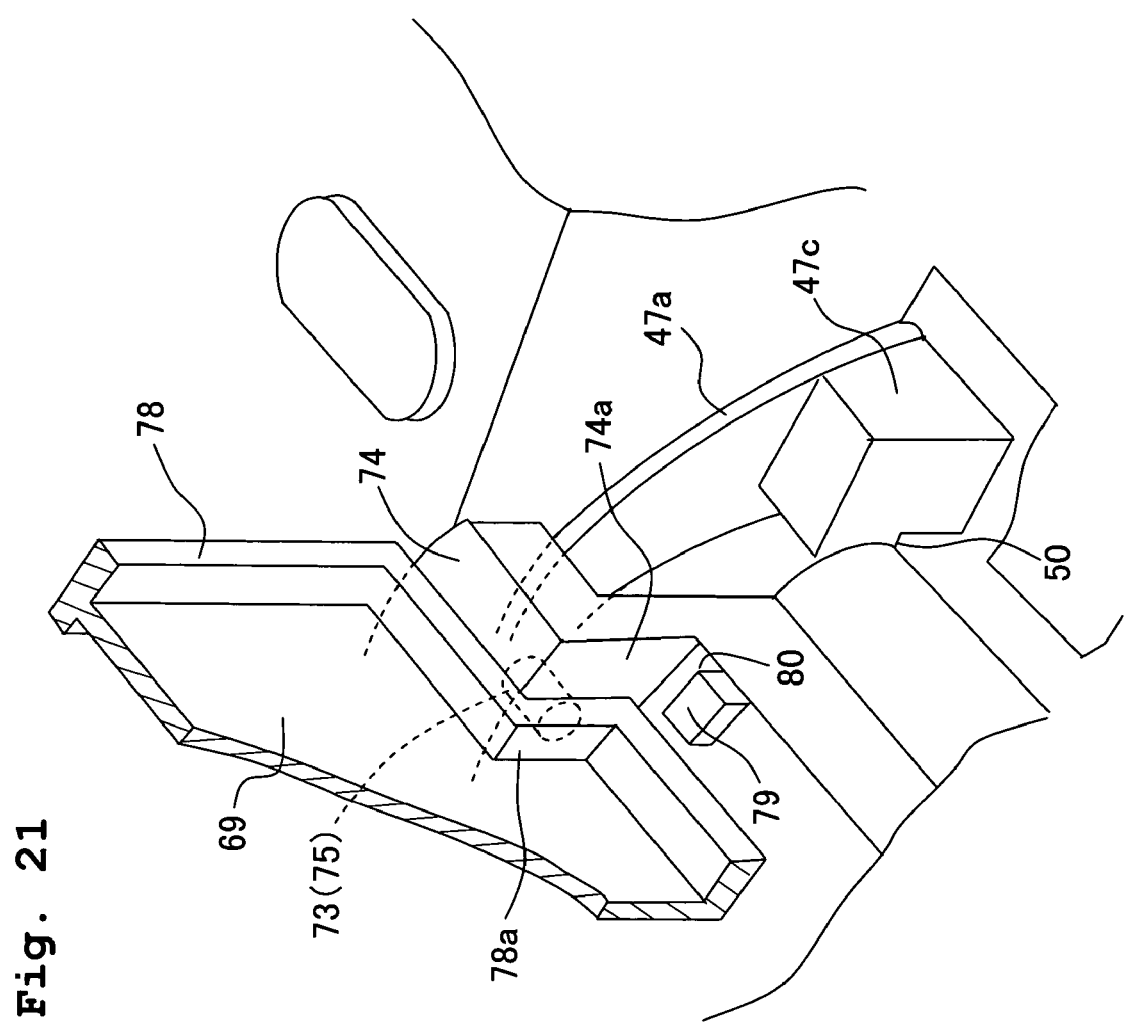
FIG. 21 is a partially cut-out perspective view of the back surface side of a base end of the covering member.

As shown in FIG. 21, the case 59 has a protrusion 79 formed on its back surface. A gap 80 is formed between the protrusion 79 and a side surface 74a of the boss 74 of the case 59. As shown in FIG. 21, the covering member 69 has a rib 78 protrudingly formed integrally on its back surface. The rib 78 include a vertical rib 78a formed on the base end side. When the LCD panel unit 37 is erected substantially in the upright state, the rib 78a is fit into the gap 80, thereby regulating the distance between the pivot pins 73 from shortening even when the covering member 69 is curved. This keeps the covering member 69 from disengaging accidentally from the case 59.

The bottom plate 45a of the accommodation recess 45 of the display cover 43 slopes gently downward toward the front side of the accommodation recess 45. The bottom plate 45a is formed with a liquid passage 81 in the form of a bank and/or a groove formed on its upper surface and extending along the three sides of the first guide opening 70, which has substantially a shape of "]" in plan view. Accordingly, even if liquid such as water is spilled on the bottom plate 45a or the covering member 69, the liquid passage 81 keeps the liquid from dropping through the first guide opening 70. This prevents electrical components such as the main control board 33 and the like in the image recording apparatus 1 from short-circuiting.

Likewise, as shown in FIGS. 7, 8 and 15, the upper cover 41 has an upper surface sloping gently downward toward its front side. The upper cover 41 also has surrounding ribs 82 formed on its upper surface around the second guide opening 72 and third guide opening 73 in a plan view. Even if liquid drops on the upper cover 41, the surrounding ribs 82 keep the liquid from entering these guide openings 71 and 72. This further improves the short circuit prevention.

With reference to FIGS. 2, 7, 8 and 15, the upper cover 41 has a protrusion 84 formed on its upper surface on a side near its end which is away from the pivot axis on which the upper body 3 pivots (on a side away from a position at which the display cover 43 is arranged). When the upper body 3 has a recess (not shown) formed on its under surface with which the protrusion 84 is engaged, then when the upper body 3 is overlapped with (laid over) the lower body 2, the protrusion 84 engages with this recess to keep the upper body 3 from shifting relative to the lower body 2.

Method for Producing the Image Recording Apparatus

Figure 25:
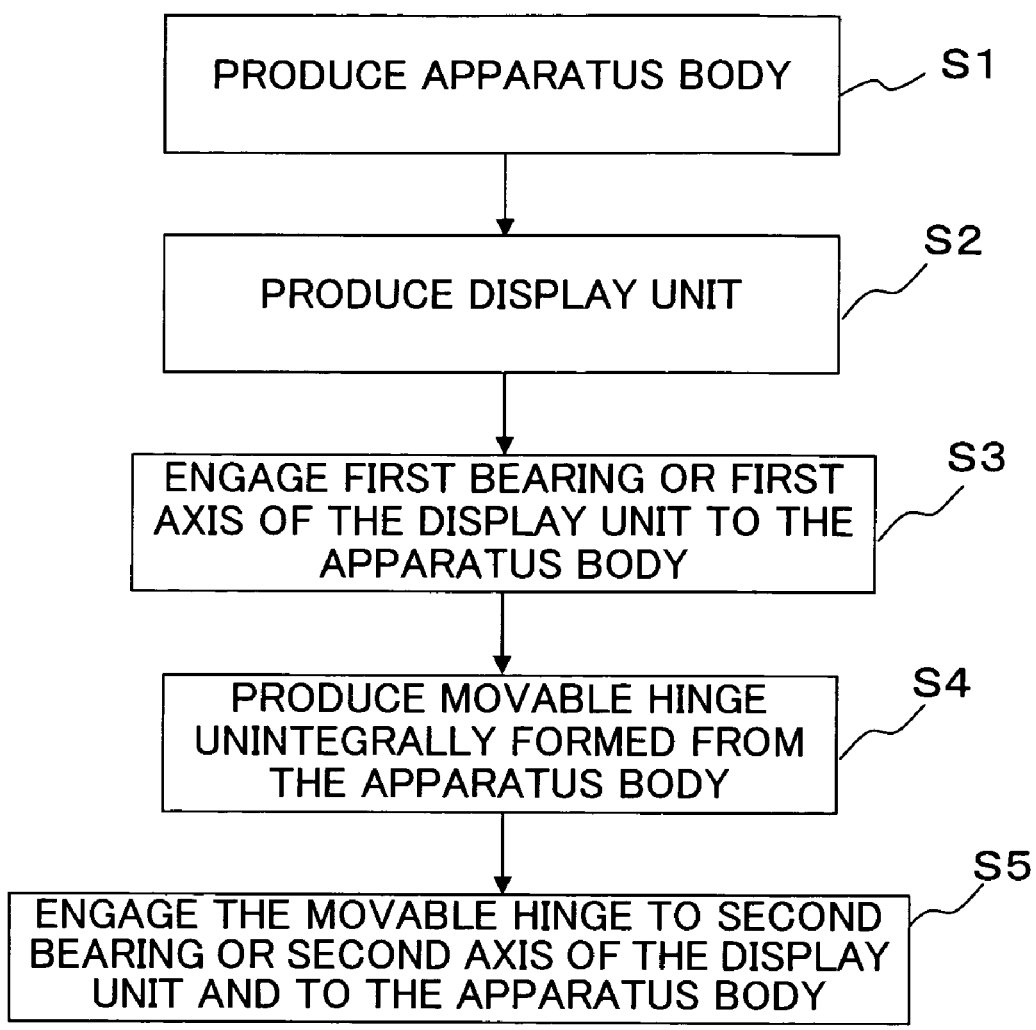
FIG. 25 is a flow chart schematically showing a process for producing the image recording apparatus of the present invention.

Next, the characteristics of the method of producing the image recording apparatus as described above will be briefly explained with reference to FIG. 25.

Firstly, an apparatus body having a first axis or a first bearing, and having a key receiving part is produced (S1).

Secondly, a display unit having a first bearing or a first axis which is to be engaged with the first axis or the first bearing of the apparatus body, and having a second bearing or a second axis is produced (S2).

Thirdly, the first bearing or the fist axis of the display unit is engaged with the first axis or the first bearing of the apparatus body (S3).

Fourthly, a separate part (movable hinge) having a second axis or a second bearing which is to be engaged with the second bearing or the second axis of the display unit, and having a key which is to be engaged with the key receiving part of the apparatus body is produced (S4).

Fifthly, the separate part is moved toward the key receiving part of the apparatus body so as to engage the second axis or the second bearing of the separate part with the second bearing or the second axis of the display unit, and to engage the key of the separate part with the key receiving part of the apparatus body.

In this embodiment, the bearings 61, 63 in the form of a cylindrical hole are formed, as the attachment-objective part, in the left and right sides respectively of the LCD panel unit 37; and the axes (pins) 47b, 49c in the form of round axis are formed in the fixed hinge 47 and the movable hinge 49, respectively, thereby making it possible to suppress the width in the left and right portions of the LCD panel unit 37. This relationship in the formation of the bearing and axes, however, may be opposite with respect to the LCD panel unit 37 and the fixed and movable hinges 47, 49. Namely, a construction may be adopted in which the axes are formed protrudingly in the left and right sides, respectively, of the LCD display unit 37 and the holes for axes, as the attachment-objective parts, may be formed in the fixed and movable hinges 47 and 49.

Further, in this embodiment, the latch mechanism (mechanism for adjusting the angular posture of the LCD panel unit 37 and for holding the LCD panel unit 37 in different angular postures) is constructed of the latch 51 provided to the movable hinge 49 and the click 64 arranged on the side of the case 59. However, the latch mechanism may be replaced by saw-tooth latches formed in the guide grooves along which the free end of the covering member 69 can be guided slidably.

When the LCD panel unit 37 is configured such that the LCD panel unit 37 may pivot between the horizontal and upright postures and may be held at any angle between these postures, it is easy for a user to adjust the view angle at which the LCD panel unit 37 is clearly visible, without shifting user's face or otherwise varying user's posture so that user's line of sight can be substantially orthogonal to the display screen of the LCD panel unit 37. This also makes it easy to adjust the contrast on the LCD panel unit 37 so as to keep the contrast sharp.

The present invention is not intended to be limited to the embodiment described as above and shown in the drawings, and the following embodiment may also be included in the technical scope of the present invention. Other than the following embodiment, the present invention can be embodied with a various kind of modifications without deviating from the gist or scope of the present invention.

In the present invention, a construction may be adopted in which a pair of left and right movable hinges pivotably supports the LCD panel unit 37 on the left and right sides of the LCD panel unit 37. Needless to say, the present invention can be applied not only to the multi-function image recording apparatus 1 but also to uni-function image recording apparatuses, with results similar to the foregoing results.

What is claimed is:

1. An image recording apparatus comprising:
   an apparatus body;
   a display unit;
   a first shaft, a first bearing, a second shaft and a second bearing which support the display unit pivotably to the apparatus body;
   a separate part which is formed unintegrally from the apparatus body, the separate part comprising the first shaft or the first bearing, and configured to move between an inserted position where the first shaft is inserted in the first bearing and an uninserted position where the first shaft is apart from the first bearing;
   an engaging part which is provided to the apparatus body; and
   a locking mechanism configured to secure the separate part with respect to the engaging part in response to a movement of the separate part, in a first direction, from the uninserted position to the inserted position, such that the separate part is prevented from moving from the inserted position to the uninserted position, wherein:
   the locking mechanism comprises a first locking part and a second locking part unintegral with the first locking part;
   the first locking part is configured to move in response to the movement of the separate part;
   the second locking part is stationary relative to the engaging part;
   the first locking part is apart from the second locking part in a second direction opposite to the first direction, when the separate part is in the uninserted position;
   the first locking part is in a locking position adjacent to the second locking part and is shifted in the first direction relative to the second locking part, when the separate part is in the inserted position; and
   the second locking part is configured to prevent the first locking part from passing over the second locking part in the second direction.

2. The image recording apparatus according to claim 1, wherein the first shaft is longer than the second shaft.

3. The image recording apparatus according to claim 1, wherein the separate part includes the first locking part and the first locking part is an engagement nail, the engaging part includes the second locking part and the second locking part is a receiving part.

4. The image recording apparatus according to claim 1, wherein a latch part is provided to the separate part, the latch part adjusting an inclination angle of the display unit relative to the apparatus body and holding an angle at which the display unit is inclined relative to the apparatus body.

5. The image recording apparatus according to claim 1, wherein: a cover is attached to an upper surface of the apparatus body; and a rib which regulates a movement of the separate part is formed in the inside of the cover.

6. The image recording apparatus according to claim 5, wherein: an entry key-arrangement section at which entry keys are arranged is provided to the cover; and a plurality of light sources corresponding to the entry keys, respectively, in the entry key-arrangement section is partitioned by the rib.

7. The image recording apparatus according to claim 1, wherein: the first bearing and the second bearing are formed in the display unit; and the first shaft and the second shaft, which are fitted to the first bearing and the second bearing, respectively, are formed integrally with the separate part and the apparatus body, respectively.

8. The image recording apparatus according to claim 1, wherein the separate part is integrally formed of a wear-resistant synthetic resin.

9. The image recording apparatus according to claim 1, wherein: a contact part which extends along a surface of the apparatus body is provided to one of the apparatus body and the separate part; and a contact-objective part is provided to a mounting part of the display unit at which the display unit is mounted on the apparatus body, the contact-objective part being brought into contact with the contact part when the display unit is erected with respect to the apparatus body.

* * * * *